United States Patent
Tu et al.

(10) Patent No.: US 12,493,756 B2
(45) Date of Patent: *Dec. 9, 2025

(54) TRANSLATION METHOD, TARGET INFORMATION DETERMINING METHOD, RELATED APPARATUS, AND STORAGE MEDIUM

(71) Applicant: TENCENT TECHNOLOGY (SHENZHEN) COMPANY LIMITED, Shenzhen (CN)

(72) Inventors: Zhaopeng Tu, Shenzhen (CN); Hao Zhou, Shenzhen (CN); Shuming Shi, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 21 days.

This patent is subject to a terminal disclaimer.

(21) Appl. No.: 18/390,153

(22) Filed: Dec. 20, 2023

(65) Prior Publication Data

US 2024/0169166 A1    May 23, 2024

Related U.S. Application Data

(63) Continuation of application No. 16/749,243, filed on Jan. 22, 2020, now Pat. No. 11,928,439, which is a
(Continued)

(30) Foreign Application Priority Data

Jul. 25, 2017   (CN) .......................... 201710612833.7

(51) Int. Cl.
  *G06F 40/30* (2020.01)
  *G06F 40/58* (2020.01)
(Continued)

(52) U.S. Cl.
  CPC ............... *G06F 40/58* (2020.01); *G06N 3/04* (2013.01)

(58) Field of Classification Search
  CPC .... G06F 40/211; G06F 40/253; G06F 40/268; G06F 40/284; G06F 40/30; G06N 3/08;
(Continued)

(56) References Cited

U.S. PATENT DOCUMENTS 9,535,960 B2 *  1/2017  Guo .................... G06N 3/045
9,846,836 B2 * 12/2017  Gao .................... G06N 3/045
(Continued)

FOREIGN PATENT DOCUMENTS

CN       105068998 A    11/2015
CN       106126507 A    11/2016
(Continued)

OTHER PUBLICATIONS

The World Intellectual Property Organization (WIPO) International Search Report for PCT/CN2018/095231 Oct. 16, 2018 6 Pages (including translation).
(Continued)

*Primary Examiner* — Lamont M Spooner
(74) *Attorney, Agent, or Firm* — Anova Law Group, PLLC

(57) ABSTRACT

A translation method is provided, including: encoding to-be-processed text information to obtain a source vector representation sequence, the to-be-processed text information belonging to a first language; obtaining a source context vector corresponding to a first instance according to the source vector representation sequence, the source context vector indicating to-be-processed source content in the to-be-processed text information at the first instance; determining a translation vector according to the source vector representation sequence and the source context vector; and
(Continued)

decoding the translation vector and the source context vector, to obtain target information of the first instance, the target information belonging to a second language.

20 Claims, 14 Drawing Sheets

Related U.S. Application Data continuation of application No. PCT/CN2018/095231, filed on Jul. 11, 2018.

(51) Int. Cl.
*G06N 3/04* (2023.01)
*G06N 3/08* (2023.01)

(58) Field of Classification Search
CPC ........ G06N 3/0895; G06N 3/09; G06N 3/091; G06N 3/096
See application file for complete search history.

(56) References Cited

U.S. PATENT DOCUMENTS

| | | | | |
|---|---|---|---|---|
| 10,319,374 | B2 * | 6/2019 | Catanzaro | G10L 15/14 |
| 10,733,380 | B2 * | 8/2020 | Leidner | G06N 3/044 |
| 10,902,216 | B2 * | 1/2021 | Lee | G06F 40/58 |
| 10,929,452 | B2 * | 2/2021 | Li | G06F 40/20 |
| 2005/0021323 | A1 * | 1/2005 | Li | G06F 40/44 704/5 |
| 2007/0150257 | A1 * | 6/2007 | Cancedda | G06F 40/45 704/2 |
| 2007/0265825 | A1 * | 11/2007 | Cancedda | G06F 40/44 704/2 |
| 2009/0083023 | A1 * | 3/2009 | Foster | G06F 40/45 704/3 |
| 2009/0182547 | A1 * | 7/2009 | Niu | G06F 40/45 704/2 |
| 2013/0282635 | A1 * | 10/2013 | Dull | G06N 3/08 706/25 |
| 2014/0350914 | A1 * | 11/2014 | Andrade Silva | G06F 40/44 704/2 |
| 2016/0085748 | A1 * | 3/2016 | Goto | G06F 40/44 704/4 |
| 2016/0117316 | A1 | 4/2016 | Le et al. | |
| 2016/0179790 | A1 | 6/2016 | Watanabe et al. | |
| 2017/0060854 | A1 * | 3/2017 | Zeng | G06F 40/30 |
| 2017/0060855 | A1 * | 3/2017 | Song | G06F 40/55 |
| 2017/0372200 | A1 * | 12/2017 | Chen | G06N 3/044 |
| 2018/0060727 | A1 * | 3/2018 | Rainwater | G06N 3/045 |
| 2018/0165278 | A1 * | 6/2018 | He | G06F 40/44 |
| 2018/0197082 | A1 * | 7/2018 | Kajino | G06N 7/01 |
| 2018/0210878 | A1 * | 7/2018 | Lee | G06N 5/025 |
| 2018/0261214 | A1 * | 9/2018 | Gehring | G06N 3/04 |
| 2018/0293228 | A1 * | 10/2018 | Tarakji | G06F 40/295 |
| 2020/0027004 | A1 * | 1/2020 | Qian | G06V 40/174 |
| 2022/0351487 | A1 * | 11/2022 | Song | G06V 10/424 |

FOREIGN PATENT DOCUMENTS

| | | |
|---|---|---|
| CN | 106372058 A | 2/2017 |
| CN | 106663092 A | 5/2017 |
| CN | 107368476 A | 11/2017 |

OTHER PUBLICATIONS

The State Intellectual Property Office of the People's Republic of China (SIPO) Office Action 1 for 201710612833.7 May 30, 2018 8 Pages (including translation).
The State Intellectual Property Office of the People's Republic of China (SIPO) Office Action 3 for 201710612833.7 Nov. 8, 2018 9 Pages (including translation).
Zhaopeng Tu et al., "Modeling Coverage for Neural Machine Translation", ACL 2016, Aug. 6, 2016 11 Pages.
Kyunghyun Cho et al., "Learning phrase represen-tations using rnn encoder-decoder for statistical machine translation", EMNLP 2014 15 Pages.
Tu et al., title={Coverage-based neural machine translation}, May 2016, openreview.net, pp. 1-4 (Year: 2016).
Mi et al., title={Coverage embedding models for neural machine translation}, 2016, journal={arXiv preprint arXiv: 1605.03148}, pp. 1-6 (Year: 2016).
Yang et al., title={Neural machine translation with recurrent attention modeling}, 2016, journal={arXiv preprint arXiv: 1607.05108}, pp. 1-5 (Year: 2016).

\* cited by examiner

TRANSLATION METHOD, TARGET INFORMATION DETERMINING METHOD, RELATED APPARATUS, AND STORAGE MEDIUM

RELATED APPLICATIONS

This application is a continuation of U.S. application Ser. No. 16/749,243 filed on Jan. 22, 2020; U.S. application Ser. No. 16/749,243 is a continuation application of PCT Application No. PCT/CN2018/095231, filed on Jul. 11, 2018, which in turn claims priority to Chinese Patent Application No. 201710612833.7, entitled "TRANSLATION METHOD, TARGET INFORMATION DETERMINING METHOD, RELATED APPARATUS, AND STORAGE MEDIUM" and filed with the China National Intellectual Property Administration on Jul. 25, 2017, all of which are incorporated by reference in their entirety.

FIELD OF THE TECHNOLOGY

Embodiments of the present disclosure relate to the field of computer technologies, and in particular, to a translation method, a target information determining method, a related apparatus, and a storage medium.

BACKGROUND OF THE DISCLOSURE

Machine translation (MT) is a procedure of transforming a text or a speech from one language to another language with a content of the same meaning by using a machine. As deep learning technology develops, a deep neural network technology is also applied to MT in recent years, and neural machine translation (NMT) has become a new generation of translation technology.

SUMMARY

Embodiments of the present disclosure provide a translation method, a target information determining method, a related apparatus, and a storage medium.

One aspect of the present disclosure provides a translation method. The translation method includes: encoding to-be-processed text information by using an encoder, to obtain a source vector representation sequence, the to-be-processed text information belonging to a first language; obtaining a source context vector corresponding to a first instance according to the source vector representation sequence, the source context vector first instance indicating to-be-processed source content in the to-be-processed text information at the first instance; determining a translation vector according to the source vector representation sequence and the source context vector, the translation vector comprising a first translation vector and a second translation vector, the first translation vector being a vector corresponding to untranslated source content in the source vector representation sequence at the first instance, the second translation vector being a vector corresponding to translated source content in the source vector representation sequence at a second instance, and the second instance being an adjacent instance before the first instance; and decoding the translation vector and the source context vector by using a decoder, to obtain target information of the first instance, the target information belonging to a second language.

Another aspect of the present disclosure provides a target information determining method. The method includes encoding to-be-processed text information, to obtain a source vector representation sequence; obtaining a source context vector corresponding to a first instance according to the source vector representation sequence, the source context vector corresponding to the first instance indicating to-be-processed source content in the to-be-processed text information at the first instance; determining a translation vector according to the source vector representation sequence and the source context vector, the translation vector comprising a first translation vector and a second translation vector, the first translation vector being a vector corresponding to an untranslated source content in the source vector representation sequence at the first instance, the second translation vector being a vector corresponding to a translated source content in the source vector representation sequence at a second instance, and the second instance being an adjacent instance before the first instance; and decoding the translation vector and the source context vector, to obtain target information of the first instance.

Another aspect of the present disclosure provides a target information determining apparatus. The apparatus includes an encoding module, configured to encode to-be-processed text information, to obtain a source vector representation sequence; a first obtaining module, configured to obtain a source context vector corresponding to a first instance according to the source vector representation sequence, the source context vector corresponding to the first instance being used for indicating to-be-processed source content in the to-be-processed text information at the first instance; a first determining module, configured to determine a translation vector according to the source vector representation sequence and the source context vector, the translation vector comprising a first translation vector and a second translation vector, the first translation vector being a vector corresponding to an untranslated source content in the source vector representation sequence at the first instance, the second translation vector being a vector corresponding to a translated source content in the source vector representation sequence at a second instance, and the second instance being an adjacent instance before the first instance; and a decoding module, configured to decode the translation vector and the source context vector, to obtain target information of the first instance.

Another aspect of the present disclosure provides a target information determining apparatus. The apparatus includes a memory and a processor configured to perform: encoding to-be-processed text information, to obtain a source vector representation sequence; obtaining a source context vector corresponding to a first instance according to the source vector representation sequence, the source context vector corresponding to the first instance being used for indicating to-be-processed source content in the to-be-processed text information at the first instance; determining a translation vector according to the source vector representation sequence and the source context vector, the translation vector comprising a first translation vector and a second translation vector, the first translation vector being a vector corresponding to an untranslated source content in the source vector representation sequence at the first instance, the second translation vector being a vector corresponding to translated source content in the source vector representation sequence at a second instance, and the second instance being an adjacent instance before the first instance; and decoding the translation vector and the source context vector, to obtain target information of the first instance; and the bus system being configured to connect the memory and the processor to enable the memory communicates with the processor.

Another aspect of the present disclosure provides a non-transitory computer readable storage medium. The computer readable medium includes an instruction, the instruction, when executed by a computer, causing the computer to perform a translation method, applied to a neural machine translation (NMT) system. The method includes encoding to-be-processed text information by using an encoder, to obtain a source vector representation sequence, the to-be-processed text information belonging to a first language; obtaining a source context vector corresponding to a first instance according to the source vector representation sequence, the source context vector first instance indicating to-be-processed source content in the to-be-processed text information at the first instance; determining a translation vector according to the source vector representation sequence and the source context vector, the translation vector comprising a first translation vector and a second translation vector, the first translation vector being a vector corresponding to untranslated source content in the source vector representation sequence at the first instance, the second translation vector being a vector corresponding to translated source content in the source vector representation sequence at a second instance, and the second instance being an adjacent instance before the first instance; and decoding the translation vector and the source context vector by using a decoder, to obtain target information of the first instance, the target information belonging to a second language.

DESCRIPTION OF EMBODIMENTS

The embodiments of the present disclosure provide a translation method, a target information determining method, and a related apparatus, which can model an untranslated source content and/or a translated source content in a source vector representation sequence, that is, separate the contents from an original language model for training, thereby reducing a difficulty of model training of a decoder, and improving a translation effect of a translation system.

The terms "first", "second", "third", "fourth", and the like (if exists) in the specification and the claims of the present disclosure and the foregoing accompanying drawings are used for distinguishing similar objects, and do not need to be used for describing a particular sequence or order. It may be understood that data used in this way is interchangeable in a suitable case, so that the embodiments of the present disclosure described herein can be implemented in a sequence in addition to the sequence shown or described herein. In addition, the terms "include", "contain" and any other variants mean to cover the non-exclusive inclusion, for example, a process, method, system, product, or device that includes a list of steps or units is not necessarily limited to those expressly listed steps or units, but may include other steps or units not expressly listed or inherent to such a process, method, product, or device.

It may be understood that, the embodiments of the present disclosure are mainly applied to an encoder-decoder model, where encoding is transforming an input sequence into a vector with a length, and decoding is transforming a vector sequence generated by an encoder into an output sequence. The encoder-decoder model is applied to many fields, such as translation, document abstract, and a question-answering system. During translation, the input sequence is a to-be-translated text, and the output sequence is a translated text. In the question-answering system, the input sequence is a raised question, and the output sequence is an answer.

It may be understood that, in different applications, the encoder and the decoder are not fixed. The encoder/decoder may form a convolutional neural network (CNN), a recurrent neural network (RNN), a gated recurrent unit (GRU), a long short term memory (LSTM), a bidirectional recurrent neural network (BiRNN), and the like. Different neural networks may be used during encoding and decoding. For example, the BiRNN may be used during encoding and the RNN may be used during decoding, or the RNN may be used during encoding and the LSTM may be used during decoding. This is not limited herein.

Figure 1:
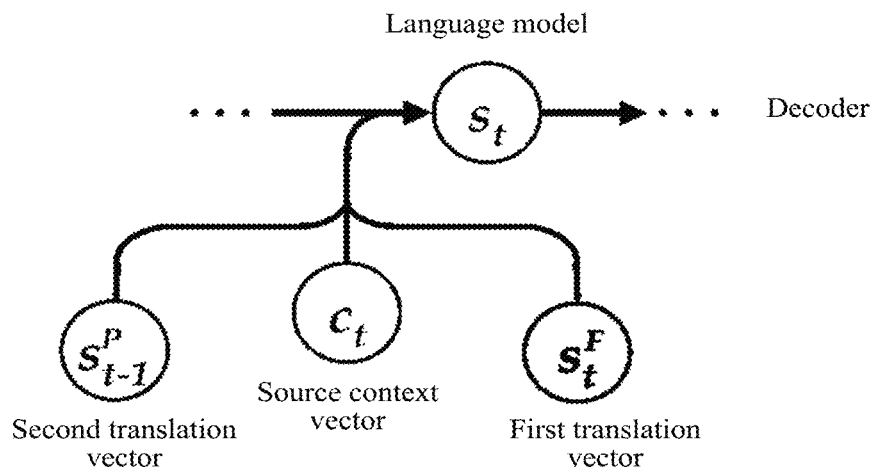
FIG. 1 is an architectural diagram of a target information determining apparatus according to the embodiments of the present disclosure.

Referring to FIG. 1, FIG. 1 is an architectural diagram of a target information determining apparatus according to the embodiments of the present disclosure. As shown in FIG. 1, two hidden layers are additionally introduced in a decoder, and the two hidden layers may be represented by using vector sequences. The $s_{t-1}^P$ in the figure represents a second translation vector corresponding to a $(t-1)^{th}$ moment, and the second translation vector is a translated source content, that is, a past translation vector. The $s_t^F$ in the figure represents a first translation vector corresponding to a $t^{th}$ moment, and the first translation vector is an untranslated source content, that is, a future translation vector. The $c_t$ in the figure represents a source context vector corresponding to the $t^{th}$ moment. The $s_t$ in the figure represents a decoder state of the $t^{th}$ moment.

The present disclosure, by introducing the additional hidden layers, directly models a past translation (translated content) and a future translation (untranslated content) on a semantic level, separates related contents from the decoder state, and improves storing and applications of a neural network translation system on the related contents, thereby improving a translation system. The method provided in the present disclosure can be applied to a mainstream neural machine translation (NMT) system.

Figure 2:
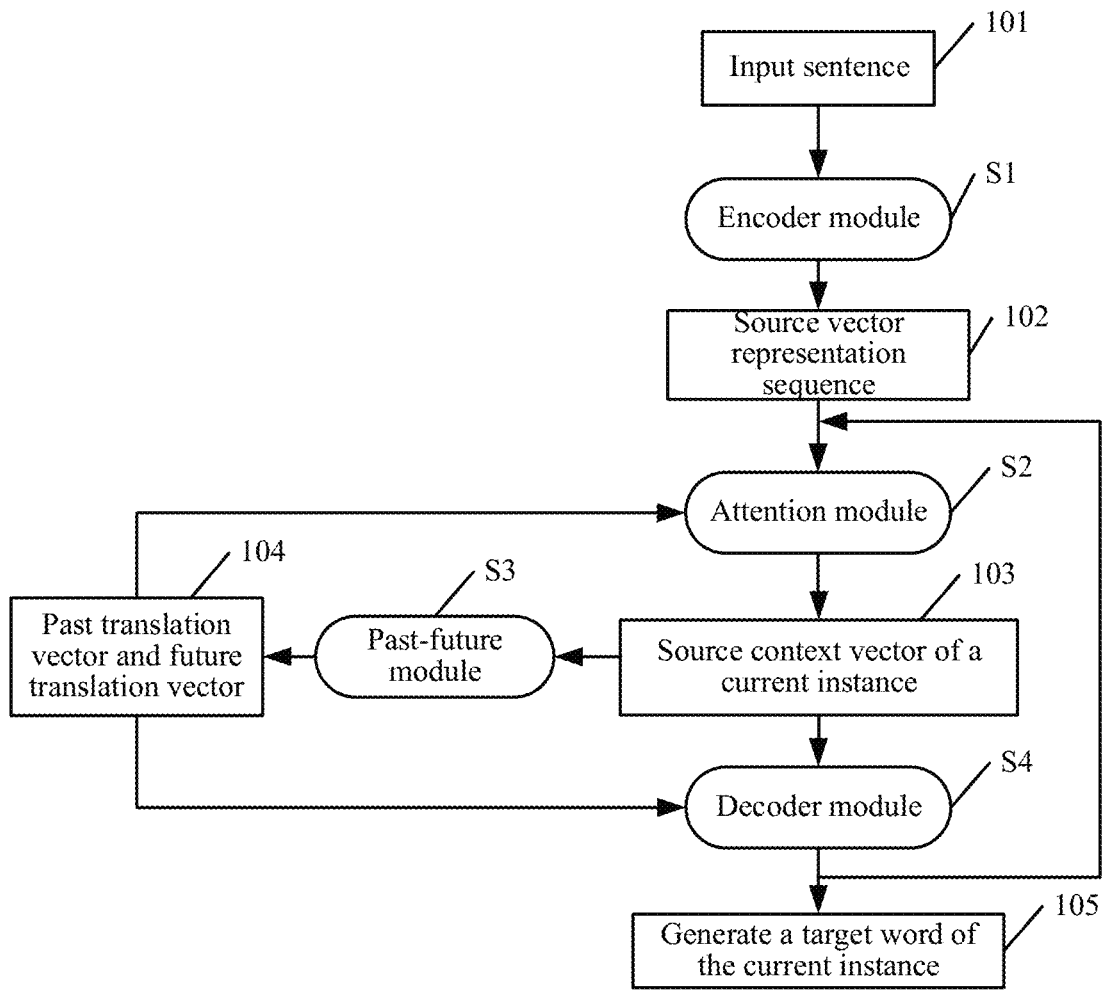
FIG. 2 is a schematic flowchart of a target information determining method according to an embodiment of the present disclosure.

For ease of understanding, referring to FIG. 2, FIG. 2 is a schematic flowchart of a target information determining method according to an embodiment of the present disclosure. As shown in FIG. 2, the method includes the following steps.

First, an encoder module S1 inputs a to-be-processed sentence in step S101, and then the encoder module S1 outputs a source vector representation sequence. Next, an attention module S2, a past-future module S3, and a decoder module S4 repeat the following steps until an entire translated text is generated.

The attention module S2 reads in a past translation vector and a future translation vector of a $(t-1)^{th}$ moment. The past translation vector is initially a zero vector, representing that there is no translated source content, and the future translation vector is initially a last vector of the source vector representation sequence, representing a summary of a source sentence. The attention module S2 outputs a source context vector of a current instance, that is, a $t^{th}$ moment, in step S103. The past-future module S3 reads the source context vector of the current instance, and updates a past translation vector and a future translation vector of the $t^{th}$ moment in step S104. The decoder module S4 reads the future translation vector of the $t^{th}$ moment, the past translation vector of the $(t-1)^{th}$ moment, the source context vector of the $t^{th}$ moment, and other standard inputs, and generates a target word of the $t^{th}$ moment in step S105.

The present disclosure can be applied to an NMT system. A translation method provided in the present disclosure is described below, and an embodiment of the translation method according to the embodiments of the present disclosure includes the following.

In the NMT system, first, to-be-processed text information is encoded by using an encoder, to obtain a source vector representation sequence. The to-be-processed text information belongs to a first language, for example, Chinese. It may be understood that, in actual application, the first language may be other types of languages.

The encoding process is specifically: inputting the to-be-processed text information into an encoder in the NMT system, then encoding the to-be-processed text information by using the encoder, and obtaining the source vector representation sequence according to an encoding result, Source vectors in the source vector representation sequence belong to the first language.

Assuming that the first language is Chinese, the to-be-processed text information may be a Chinese sentence, and the sentence includes a plurality of phrases. After the Chinese sentence is encoded, the source vector representation sequence may be obtained, and a source context vector corresponding to a current instance, that is, a first instance, is further obtained. The source context vector i used for representing to-be-processed source content, and the source content may be specifically a word in the Chinese sentence.

It may be understood that, the source context vector corresponding to the first instance is used for indicating to-be-processed source content in the to-be-processed text information at the first instance.

Next, the NMT system determines a first translation vector and/or a second translation vector according to the source vector representation sequence and the source context vector. The first translation vector indicates an untranslated source content in the source vector representation sequence at the first instance, the second translation vector indicates a translated source content in the source vector representation sequence at a second instance, and the second instance is an adjacent instance before the first instance. If the first instance is the $t^{th}$ moment, the second instance is the $(t-1)^{th}$ moment.

For ease of description, the first translation vector and/or the second translation vector may be referred to as a translation vector. The translation vector may be the first translation vector, may be the second translation vector, or may be the first translation vector and the second translation vector.

That is, the first translation vector is a vector corresponding to the untranslated source content in the source vector representation sequence at the first instance, and the second translation vector is a vector corresponding to the translated source content in the source vector representation sequence at the second instance.

For example, it is assumed that the source content corresponding to the source vector representation sequence is "每月 到 世界各地 的 航班 多达 1300 个。". Words corresponding to the source vectors are "每月", "到", "世界各地", "的", "航班", "多达" and "1300 个". If the word "世界各地" is to be translated at the current instance, the future translation vector may be understood as vectors respectively corresponding to the untranslated "世界各地", "的", "航班", "多达" and "1300 个", and the past translation vector may be understood as vectors corresponding to the translated "每月" and "到".

Finally, in the NMT system, the first translation vector and/or the second translation vector and the source context vector are decoded by using a decoder, to obtain target information of the first instance. The target information belongs to a second language. It may be understood that, the second language is a language different from the first language, and may be English, French, Japanese, and the like. This is not limited herein.

Assuming that the word "世界各地" is to be translated at the first instance, the outputted target information may be "all parts of the world", that is, the first language is Chinese, and the second language is English. The procedure of machine translation ends here.

In this embodiment of the present disclosure, a translation method is provided, which can model an untranslated source content and/or a translated source content in a source vector representation sequence, that is, separate the contents from an original language model for training, thereby reducing a difficulty of model training of a decoder, and improving a translation effect of a translation system.

Figure 3:
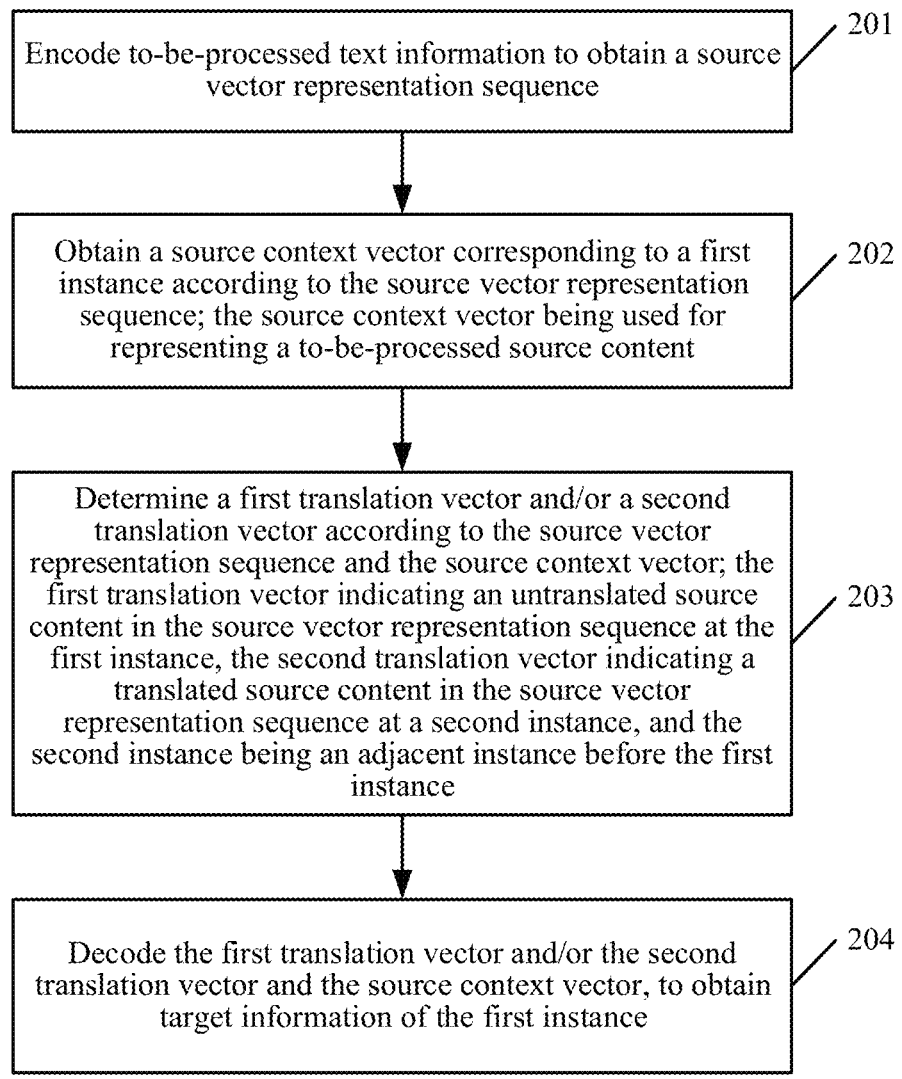
FIG. 3 is a schematic diagram of an embodiment of the target information determining method according to the embodiments of the present disclosure.

A target information determining method of the present disclosure is described below, and the method may be performed by an electronic device. Referring to FIG. 3, an embodiment of the target information determining method according to the embodiments of the present disclosure includes the following steps:

201: Encode to-be-processed text information, to obtain a source vector representation sequence.

In this embodiment, the to-be-processed text information is encoded by an encoder in a target information determining apparatus. The to-be-processed text information may be a to-be-translated sentence, for example, "多个机场被关闭。". After the sentence is encoded, the source vector representation sequence may be obtained.

Each vector in the source vector representation sequence corresponds to a source content (source word). For example, in the sentence "多个机场被关闭。", the source contents are respectively "多个"(many), "机场"(airports), "被"(are), "关闭"(closed), "○" and "<eos>". According to the sequence, the decoder in the target information determining apparatus generates a translated text word by word.

202: Obtain a source context vector corresponding to a first instance according to the source vector representation sequence, the source context vector being used for representing to-be-processed source content.

It may be understood that, the source context vector corresponding to the first instance is used for indicating to-be-processed source content in the to-be-processed text information at the first instance.

In this embodiment, the target information determining apparatus may obtain the source context vector corresponding to the first instance according to the source vector representation sequence. The first instance is the $t^{th}$ moment in this embodiment of the present disclosure, and the source context vector is used for representing the to-be-processed source content.

Specifically, the target information determining apparatus outputs an alignment probability, for example, 0.0 or 0.2, for each source content. A sum of the alignment probabilities in the source vector representation sequence is 1, and a greater alignment probability represents that the source content is more related to to-be-generated target information. By weighting the alignment probability and a semantic vector, the source context vector of the $t^{th}$ moment may be generated.

203: Determine a first translation vector and/or a second translation vector according to the source vector representation sequence and the source context vector, the first translation vector indicating an untranslated source content in the source vector representation sequence at the first instance, the second translation vector indicating a translated source content in the source vector representation sequence at a second instance, and the second instance being an adjacent instance before the first instance.

It may be understood that, the first translation vector and/or the second translation may be referred to as a translation vector.

In this embodiment, the target information determining apparatus may determine the first translation vector according to the source vector representation sequence and the source context vector, or determine the second translation vector according to the source vector representation sequence and the source context vector, or determine the first translation vector and the second translation vector according to the source vector representation sequence and the source context vector. The first translation vector indicates the untranslated source content in the source vector representation sequence at the first instance, the second translation vector indicates the translated source content in the source vector representation sequence at the second instance, and the second instance is an adjacent instance before the first instance.

Specifically, the first translation vector represents a future translation vector of the $t^{th}$ moment, and the second translation vector represents a past translation vector of the $(t-1)^{th}$ moment. When one piece of target information is generated, a corresponding source context vector $c_t$ is added to a past translation vector of a previous moment to obtain a new past translation vector, and $c_t$ is subtracted from a future translation vector of the previous moment to obtain a new future translation vector.

204: Decode the first translation vector and/or the second translation vector and the source context vector, to obtain target information of the first instance.

In this embodiment, the decoder in the target information determining apparatus may decode the first translation vector and the source context vector by using a neural network output layer, to obtain the target information of the first instance. Alternatively, the decoder may decode the second translation vector and the source context vector, to obtain the target information of the first instance. Alternatively, the decoder may decode the first translation vector, the second translation vector, and the source context vector, to obtain the target information of the first instance.

A plurality of pieces of to-be-selected information may be generated in a procedure of generating the target information, and one word with a highest similarity is finally outputted as the target information. For example, in the sentence "多个机场被关闭。", the "多个" may be translated into "many" and "much". However, it may be known from semantic knowledge stored in a decoder state vector that, "many" is used before a countable noun, and therefore, the "多个" herein is finally translated into "many".

In the embodiments of the present disclosure, a target information determining method is provided. First a target information determining apparatus encodes to-be-processed text information, to obtain a source vector representation sequence; then obtains a source context vector corresponding to a first instance according to the source vector representation sequence, the source context vector being used for representing to-be-processed source content; and determines a first translation vector and/or a second translation vector according to the source vector representation sequence and the source context vector, the first translation vector indicating an untranslated source content in the source vector representation sequence at the first instance, the second translation vector indicating a translated source content in the source vector representation sequence at a second instance, and the second instance is an adjacent instance before the first instance. Finally, the target information determining apparatus decodes the first translation vector and/or the second translation vector and the source context vector, to obtain target information of the first instance. Through the foregoing manner, the untranslated source content and/or the translated source content in the source vector representation sequence can be modeled, that is, the contents can be separated from an original language model for training, thereby reducing a difficulty of model training of a decoder, and improving a translation effect of a translation system.

In some embodiments, based on the embodiment corresponding to FIG. 3, in an optional embodiment of the target information determining method provided in the embodiments of the present disclosure, the determining a first translation vector according to the source vector representation sequence and the source context vector may include:

obtaining a third translation vector corresponding to the second instance according to the source vector representation sequence; and processing the third translation vector and the source context vector by using a preset neural network model, to obtain the first translation vector.

It may be understood that, the third translation vector is a vector corresponding to an untranslated source content in the source vector representation sequence at the second instance.

In this embodiment, the procedure that the target information determining apparatus determines the first translation vector according to the source vector representation sequence and the source context vector may include: first obtaining the third translation vector corresponding to the second instance according to the source vector representation sequence; and then processing the third translation vector and the source context vector by using the preset neural network model, to obtain the first translation vector.

Specifically, assuming that the first instance is the $t^{th}$ moment and the second instance is the $(t-1)^{th}$ moment, the target information determining apparatus needs to read in the source context vector of the first instance (representing the translated source content at the first instance), and further update the stored future translation vector. The future translation vector is initialized as a summary (usually a last vector of the source vector representation sequence) of the source sentence, representing that no initial source contents are translated. Therefore, at each moment, updating is as follows:

$$s_t^F = \text{RNN}(s_{t-1}^F, c_t).$$

$s_t^F$ represents the future translation vector of the $t^{th}$ moment, that is, the first translation vector, $s_{t-1}^F$ represents the future translation vector of the $(t-1)^{th}$ moment, that is, the third translation vector, $c_t$ represents the source context vector of the $t^{th}$ moment, and RNN( ) represents that calculation is performed by using an RNN model.

The RNN is merely an example of the preset neural network model herein, and in actual application, the preset neural network model may be the LSTM, a latency network model or a gated convolutional neural network, or may be other types of neural network structures. This is not limited herein.

Second, in this embodiment of the present disclosure, how to determine the first translation vector according to the source vector representation sequence and the source context vector is described. That is, the third translation vector corresponding to the second instance is obtained according to the source vector representation sequence; and then the third translation vector and the source context vector are processed by using the preset neural network model, to obtain the first translation vector. Through the foregoing manner, the first translation vector is outputted by using the preset neural network model, which can improve accuracy of the future translation vector.

In some embodiments, based on the embodiment corresponding to FIG. 3, in another optional embodiment of the target information determining method provided in the embodiments of the present disclosure, the determining a first translation vector and a second translation vector according to the source vector representation sequence and the source context vector may include:

obtaining a third translation vector corresponding to the second instance according to the source vector representation sequence;

processing the third translation vector and the source context vector by using a preset neural network model, to obtain the first translation vector; and obtaining the second translation vector according to a location of the source context vector in the source vector representation sequence, the second translation vector being used for updating a fourth translation vector corresponding to the first instance, and the fourth translation vector being obtained by processing the second translation vector and the source context vector by using the preset neural network model.

It may be understood that, the fourth translation vector is a vector corresponding to a translated source content in the source vector representation sequence at the first instance.

In this embodiment, assuming that the first instance is the $t^{th}$ moment and the second instance is the $(t-1)^{th}$ moment, the source context vector (that is, a source semantic content that is being translated) of the first instance is represented as $c_t$, which is obtained by an attention module, and $c_t$ is also used for updating the past translation vector and the future translation vector. The updating is as follows:

$$s_t^F = \text{RNN}(s_{t-1}^F, c_t).$$

$s_t^F$ represents the future translation vector of the $t^{th}$ moment, that is, the first translation vector, $s_{t-1}^F$ represents the future translation vector of the $(t-1)^{th}$ moment, that is, the third translation vector, $c_t$ represents the source context vector of the $t^{th}$ moment, and RNN( ) represents that calculation is performed by using an RNN model.

$$s_t^P = \text{RNN}(s_{t-1}^P, c_t).$$

$s_t^P$ represents the past translation vector of the $t^{th}$ moment, that is, the fourth translation vector, $s_{t-1}^P$ represents the past translation vector of the $(t-1)^{th}$ moment, that is, the second translation vector, $c_t$ represents the source context vector of the $t^{th}$ moment, and RNN( ) represents that calculation is performed by using an RNN model.

The RNN is merely an example of the preset neural network model, and in actual application, the preset neural network model may be the LSTM, a latency network model or a gated convolutional neural network, or may be other types of neural network structures. This is not limited herein.

It is expected that a rule of "accumulation" can be achieved by modeling, that is, the source context vector $c_t$ (the source content that is being translated at the $t^{th}$ moment) of the $t^{th}$ moment and the past translation vector (the translated source content till the $(t-1)^{th}$ moment) of the $(t-1)^{th}$ moment are accumulated. Therefore, the RNN structure is selected, because the RNN can well summarize historical information till the $t^{th}$ moment, which corresponds to the expectation. For example, $s_t^P = s_{t-1}^P + c_t$ and $s_t^F = s_{t-1}^F - c_t$.

Second, in this embodiment of the present disclosure, how to determine the first translation vector and the second translation vector according to the source vector representation sequence and the source context vector is described.

That is, the third translation vector corresponding to the second instance is obtained according to the source vector representation sequence; and then the third translation vector and the source context vector are processed by using the preset neural network model, to obtain the first translation vector, and further, the second translation vector may be obtained according to the location of the source context vector in the source vector representation sequence, the second translation vector being used for updating the fourth translation vector corresponding to the first instance, and the fourth translation vector being obtained by processing the second translation vector and the source context vector by using the preset neural network model. Through the foregoing manner, accuracy of the past translation vector and the future translation vector can be improved.

In some embodiments, based on the embodiment corresponding to FIG. 3, in another optional embodiment of the target information determining method provided in the embodiments of the present disclosure, the determining a second translation vector according to the source vector representation sequence and the source context vector may include:

obtaining the second translation vector according to a location of the source context vector in the source vector representation sequence, the second translation vector being used for generating a fourth translation vector corresponding to the first instance, and the fourth translation vector being obtained by processing the second translation vector and the source context vector by using a preset neural network model.

In this embodiment, the target information determining apparatus may obtain the second translation vector of the second instance according to a location of the source context vector of the first instance in the source vector representation sequence.

Specifically, assuming that the first instance is the $t^{th}$ moment and the second instance is the $(t-1)^{th}$ moment, the target information determining apparatus needs to read in a source context vector of a $(t-2)^{th}$ moment and a past translation vector of the $(t-2)^{th}$ moment, then process the source context vector of the $(t-2)^{th}$ moment and the past translation vector of the $(t-2)^{th}$ moment by using the preset neural network model, to obtain the past translation vector of the $(t-1)^{th}$ moment. The past translation vector is initialized as a zero vector $s_0^P=0$, representing that there is no source content translated initially. Therefore, at each moment, updating is as follows:

$$s_t^P = \text{RNN}(s_{t-1}^P, c_t).$$

$s_t^P$ represents the past translation vector of the $t^{th}$ moment, that is, the fourth translation vector, $s_{t-1}^P$ represents the past translation vector of the $(t-1)^{th}$ moment, that is, the second translation vector, $c_t$ represents the source context vector of the $t^{th}$ moment, and RNN( ) represents that calculation is performed by using an RNN model.

The RNN is merely an example of the preset neural network model, and in actual application, the preset neural network model may be the LSTM, a latency network model or a gated convolutional neural network, or may be other types of neural network structures. This is not limited herein.

Second, in this embodiment of the present disclosure, how to determine the second translation vector according to the source vector representation sequence and the source context vector is described. That is, the second translation vector is obtained according to the location of the source context vector in the source vector representation sequence, the second translation vector being used for generating the fourth translation vector corresponding to the first instance, and the fourth translation vector being obtained by processing the second translation vector and the source context vector by using the preset neural network model. Through the foregoing manner, the second translation vector is outputted by using the preset neural network model, which can improve accuracy of the past translation vector.

In some embodiments, based on any one of the foregoing two embodiments corresponding to FIG. 3, in another optional embodiment of the target information determining method provided in the embodiments of the present disclosure, the processing the third translation vector and the source context vector by using the preset neural network model, to obtain the first translation vector may include:

subtracting the source context vector from the third translation vector by using a GRU, to obtain the first translation vector.

It may be understood that, the GRU is an abbreviation of the Gated Recurrent Unit.

In this embodiment, in the procedure of obtaining the future translation vector, modeling is needed to achieve a rule of "degression". Assuming that the first instance is the $t^{th}$ moment and the second instance is the $(t-1)^{th}$ moment, the source context vector $c_t$ of the first instance (the translated source content at the first instance) is subtracted from the third translation vector (a vector corresponding to a source content that is not translated till the second instance). Herein a plurality of types of structures is designed to model the rule of "degression". The present disclosure may be applied to a plurality of types of RNN structures, and herein description is provided by using a mainstream GRU as an example.

Figure 4:
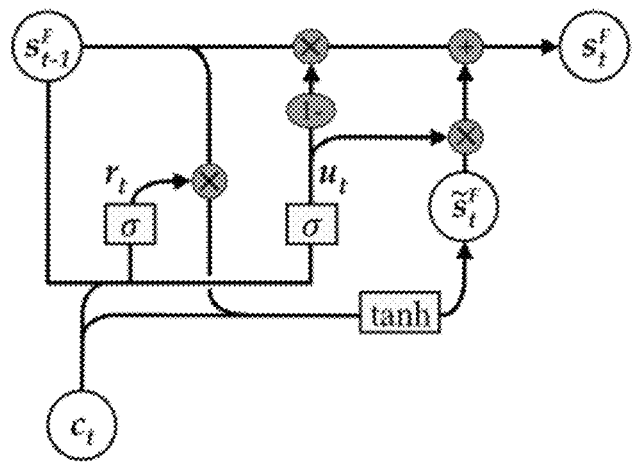
FIG. 4 is a schematic structural diagram of a gated recurrent unit (GRU) according to an embodiment of the present disclosure.

Referring to FIG. 4, FIG. 4 is a schematic structural diagram of a GRU according to an embodiment of the present disclosure, a "decreasing" model may be established according to a standard GRU structure corresponding to FIG. 4, and it is expected that parameters of the GRU can automatically learn the following rules:

$$s_t^F = GRU(s_{t-1}^F, c_t) = u_t \cdot s_{t-1}^F + (1-u_t) \cdot \tilde{s}_t^F;$$

$$\tilde{s}_t^F = \tanh(U(r_t \cdot s_{t-1}^F) + Wc_t);$$

$$r_t = \sigma(U_r s_{t-1}^F + W_r c_t); \text{ and}$$

$$u_t = \sigma(U_u s_{t-1}^F + W_u c_t).$$

$s_t^F$ represents the future translation vector of the $t^{th}$ moment, that is, the first translation vector, $s_{t-1}^F$ represents the future translation vector of the $(t-1)^{th}$ moment, that is, the third translation vector, $c_t$ represents the source context vector of the first instance, $u_t$ represents an update gate of the first instance, $\tilde{s}_t^F$ represents an update state candidate generated by the GRU, that is, a middle vector, $r_t$ represents an outputted weight vector, tan h( ) represents a hyperbolic tangent function, and σ( ) represents a sigmoid function. U, W, $U_r$, $W_r$, $U_u$ and $W_u$ represent parameters related to the functions, and the parameters are trained together with other parameters of the neural network translation system.

Figure 5:
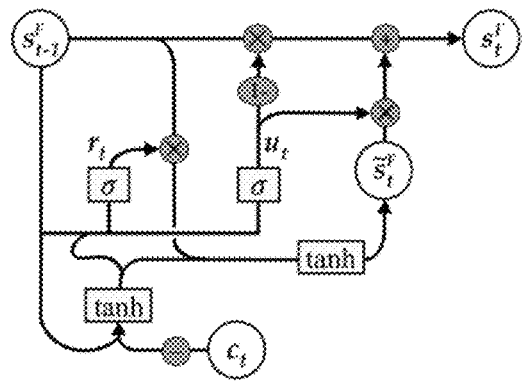
FIG. 5 is another schematic structural diagram of a GRU according to an embodiment of the present disclosure.

However, the GRU structure corresponding to FIG. 4 does not provide a signal that needs to be "decreased", and in this way, difficulty that the GRU learns the rule is increased. Therefore, the GRU structure can be improved, to obtain a GRU-o structure corresponding to FIG. 5. Referring to FIG. 5, FIG. 5 is another schematic structural diagram of a GRU according to an embodiment of the present disclosure, and in this structure, first the source context vector $c_t$ of the first instance (that is, the $t^{th}$ moment) is subtracted from the future translation vector of the second instance (that is, the $(t-1)^{th}$ moment). The future translation vector of the second instance is the third translation vector. After the needed first translation vector is obtained, the first translation vector is transmitted into the GRU structure. Specifically, refer to the following formulas:

$$s_t^F = GRU(s_{t-1}^F, c_t)); \text{ and}$$

$$M(s_{t-1}^F, c_t) = \tan h(U_m s_{t-1}^F - W_m c_t).$$

$M(s_{t-1}^F, c_t)$ represents subtracting $c_t$ from $s_{t-1}^F$, $U_m$ and $W_m$ represent parameters related to the functions, and the parameters are trained together with other parameters of the neural network translation system.

Again, in this embodiment of the present disclosure, the GRU can be used to subtract the source context vector from the third translation vector, to obtain the first translation vector, and further transmit the obtained first translation vector into the GRU structure. Through the foregoing manner, the signal of decreasing can be provided in the GRU, which helps to learn the rule, thereby improving accuracy of model training.

In some embodiments, based on any one of the foregoing two embodiments corresponding to FIG. 3, in another optional embodiment of the target information determining method provided in the embodiments of the present disclosure, the processing the third translation vector and the source context vector by using the preset neural network model, to obtain the first translation vector may include:
processing the third translation vector and the source context vector by using the GRU, to obtain a middle vector; and
performing an interpolation combination on the middle vector and the third translation vector, to obtain the first translation vector.

Figure 6:
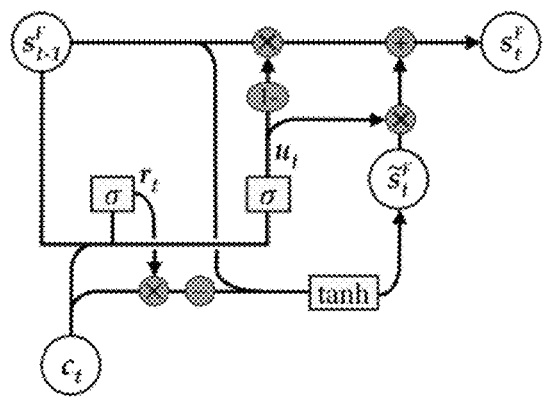
FIG. 6 is another schematic structural diagram of a GRU according to an embodiment of the present disclosure.

In this embodiment, an operation of "degression" can be performed inside the GRU. Referring to FIG. 6, FIG. 6 is another schematic structural diagram of a GRU according to an embodiment of the present disclosure. Assuming that the first instance is the $t^{th}$ moment and the second instance is the $(t-1)^{th}$ moment, parameters of the GRU can automatically learn the following rule:

$$\tilde{s}_t^F = \tan h(U s_{t-1}^F - W(r_t \cdot c_t).$$

$\tilde{s}_t^F$ represents an update state candidate generated by the GRU, that is, a middle vector, $r_t$ represents an output weight vector, tan h( ) represents a hyperbolic tangent function, $s_{t-1}^F$ the future translation vector of the $(t-1)^{th}$ moment, that is, the third translation vector, and $c_t$ represents the source context vector of the first instance.

After $\tilde{s}_t^F$ is obtained, an interpolation combination may be performed on $\tilde{s}_t^F$ and the third translation vector of the $(t-1)^{th}$ moment, to obtain the final first translation vector $s_t^F$.

Through the foregoing operation, a past translation vector and a future translation vector may be obtained at each moment. $s_t^P$ represents a translated source content till the $t^{th}$ moment, and $s_t^F$ represents an untranslated source content till the $t^{th}$ moment.

Again, in this embodiment of the present disclosure, a procedure that the target information determining apparatus processes the third translation vector and the source context vector by using a preset neural network model, to obtain the first translation vector may be: first processing the third translation vector and the source context vector by using the GRU, to obtain a middle vector, and performing an interpolation combination on the middle vector and the third translation vector, to obtain the first translation vector. Through the foregoing manner, performing the operation of decreasing inside the GRU helps to improve operating accuracy and operating efficiency.

In some embodiments, based on the embodiment corresponding to FIG. 3, in another optional embodiment of the target information determining method provided in the embodiments of the present disclosure, the obtaining a source context vector corresponding to a first instance according to the source vector representation sequence may include: determining an alignment probability of the source content according to a decoder state of the second instance, the second translation vector, the third translation vector, and a vector of the source content in the source vector representation sequence; and determining the source context vector corresponding to the first instance according to the alignment probability of the source content and a semantic vector of the source content.

Figure 7:
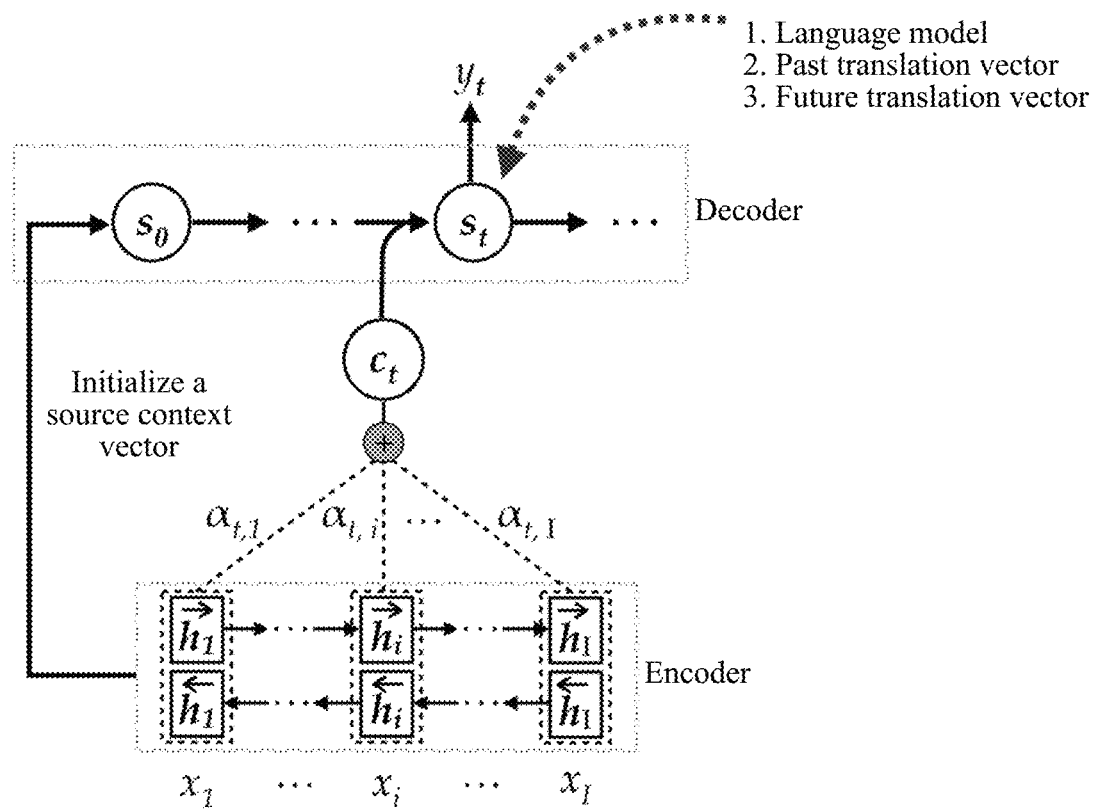
FIG. 7 is a schematic diagram of an embodiment of an enhancement attention module according to the embodiments of the present disclosure.

In this embodiment, how the target information determining apparatus obtains a source context vector corresponding to a first instance according to the source vector representation sequence is described. For ease of understanding, referring to FIG. 7, FIG. 7 is a schematic diagram of an embodiment of an enhancement attention module according to the embodiments of the present disclosure. Specifically, assuming that the first instance is the $t^{th}$ moment, the second instance is the $(t-1)^{th}$ moment, and the target information determining apparatus includes an encoder and a decoder, a decoder state $s_{t-1}$ of the decoder at the second instance, the second translation vector $s_{t-1}^P$, the third translation vector $s_{t-1}^F$, and the vector $h_i$ of the source content in the source vector representation sequence, the alignment probability $\alpha_{t,i}$ of the source content is determined.

That is, the alignment probability $\alpha_{t,i}$ is calculated by using the following formula:

$$\alpha_{t,i} = \text{soft max}(a(s_{t-1}, h_i, s_{t-1}^F, s_{t-1}^P)).$$

$\alpha_{t,i}$ is an alignment probability distribution output by an attention mechanism for each source content, a sum of the alignment probability distributions being 1, $h_i$ is a vector representation for an $t^{th}$ source content in the input sentence by the encoder, and soft max( ) represents a normalization operation. A value inputted by the neural network is usually a positive or negative value. Therefore, an index value of the value is usually transformed into a positive value first, and then all the index values are normalized, to obtain the probability distribution. a( ) is an operation of the attention module.

After the alignment probability $\alpha_{t,i}$ of the source content is obtained, $\alpha_{t,i}$ is weighted and summed with the corresponding semantic vector $x_i$ of the source content, to obtain the source context vector corresponding to the first instance. For example, if $\alpha_{t,1}$ of the first instance is 0.5, $\alpha_{t,2}$ is 0.3, $\alpha_{t,3}$ is 0.2, $x_1$ is 2, $x_2$ is 4, and $x_3$ is 6, a calculation manner of the source context vector $c_t$ corresponding to the first instance is:

$$c_t = 0.5 \times 2 + 0.3 \times 4 + 0.2 \times 6 = 3.4$$

It may be understood that, in actual application, a calculation manner of the alignment probability $\alpha_{t,i}$ may also be $\alpha_{t,i} = \text{soft max}(a(s_{t-1}, h_i, s_{t-1}^P))$ or $\alpha_{t,i} = \text{soft max}(a(s_{t-1}, h_i, s_{t-1}^F))$.

Second, in this embodiment of the present disclosure, first the alignment probability of the source content may be determined according to the decoder state of the second instance, the second translation vector, the third translation vector, and the vector of the source content in the source vector representation sequence, and then the source context vector of the first instance is determined according to the alignment probability of the source content and the semantic vector of the source content. Through the foregoing manner, the attention module in the target information determining apparatus can learn which source contents have been translated, and which source contents have not been translated, so that more attention is paid on the untranslated contents while less attention is paid on the translated contents, thereby alleviating the problem of missing translation and repeated translation.

In some embodiments, based on the embodiment corresponding to FIG. 3, in another optional embodiment of the target information determining method provided in the embodiments of the present disclosure, before the decoding the first translation vector and/or the second translation vector and the source context vector, to obtain target information of the first instance, the method may further include: determining a decoder state of the first instance according to the decoder state of the second instance, target information of the second instance, the source context vector, the first translation vector, and the second translation vector; and correspondingly, the decoding the first translation vector and/or the second translation vector and the source context vector, to obtain target information of the first instance may include: decoding the decoder state of the first instance, the source context vector, and the first translation vector and/or the second translation vector, to obtain the target information of the first instance.

In this embodiment, before the target information determining apparatus obtains the target information of the first instance, the decoder state of the first instance needs to be first determined according to the decoder state of the second instance, the target information of the second instance, the source context vector, the first translation vector, and the second translation vector. The first instance is the $t^{th}$ moment, and is also used as the current instance, and the second instance is the $(t-1)^{th}$ moment, and is also used as the last moment.

Figure 8:
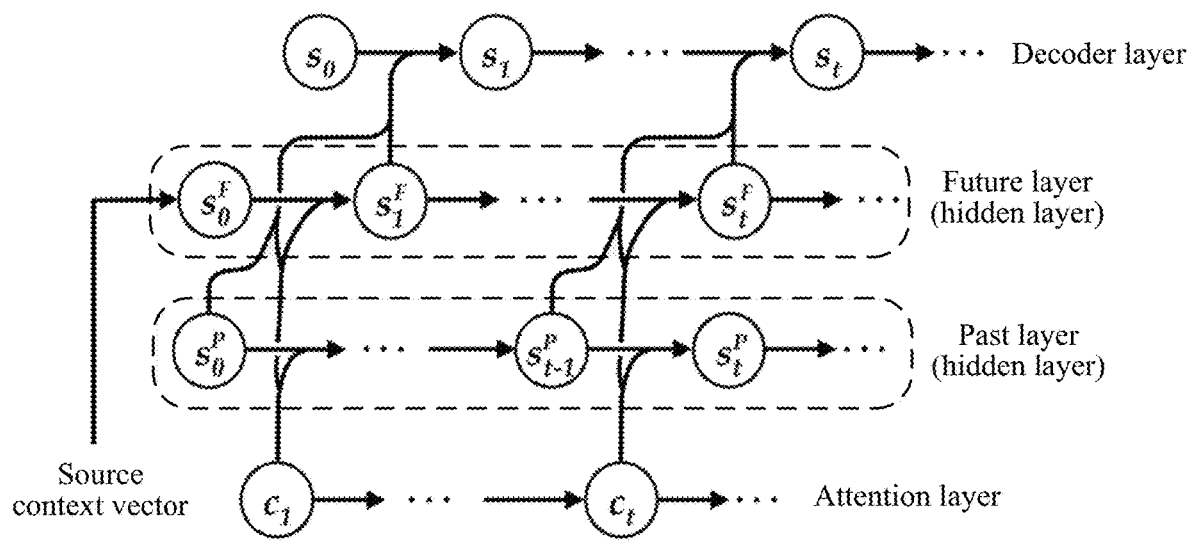
FIG. 8 is a schematic diagram of an embodiment of an enhancement decoder state according to the embodiments of the present disclosure.

Specifically, referring to FIG. 8, FIG. 8 is a schematic diagram of an embodiment of an enhancement decoder state according to the embodiments of the present disclosure. The decoder state of the second instance is $s_{t-1}$, the target information of the second instance is $y_{t-1}$, the source context vector is $c_t$, the first translation vector is $s_t^F$, and the second translation vector is $s_{t-1}^P$. The decoder state $s_t$ of the first instance may be calculated and obtained by using the following formula:

$$s_t = f(s_{t-1}, y_{t-1}, c_t, s_t^F, s_{t-1}^P).$$

f( ) represents an activation function that updates the decoder state, which is a standard configuration of a neural network translation model. An input of the activation function may be flexibly changed as needed.

Second, in this embodiment of the present disclosure, first the decoder state of the first instance needs to be determined according to the decoder state of the second instance, the target information of the second instance, the source context vector, the first translation vector, and the second translation vector, and then the decoder state of the first instance, the source context vector, the first translation vector and/or the second translation vector are decoded, to obtain the target information of the first instance. Through the foregoing manner, models of the first translation vector and/or the second translation vector are separated from the decoder state, and may form a complete source semantic vector representation with the source context vector outputted by the attention module at the first instance, to be transmitted to the decoder, to generate more accurate target information.

In some embodiments, based on any one of the rear two embodiments corresponding to FIG. 3, another optional embodiment of the target information determining method provided in the embodiments of the present disclosure may further include: obtaining a first indicator expected value according to the first translation vector and the third translation vector, where the first indicator expected value is used for representing a consistency situation of semantics between a future translation vector change and the target information of the first instance; obtaining a second indicator expected value according to the second translation vector and the fourth translation vector, where the second indicator expected value is used for representing a consistency situation of semantics between a past translation vector change and the target information of the first instance; and determining a training target according to the first indicator expected value and the second indicator expected value, where the training target is used for building a preset neural network model.

In this embodiment, a method of adding the training target is further provided, and by adding the training target, the preset neural network model may be better trained and obtained. For ease of description, training the future translation vector is described as an example, and it may be understood that, the manner of training the future translation vector is similar to the manner of training the past translation vector, and is not described herein again. Using the future translation vector as an example, $\Delta_t^F = s_{t-1}^F - s_t^F \approx c_t$ needs to be achieved as far as possible, that is, an information gap between two translation vectors of adjacent instances is roughly the same as a source content being translated at this moment, to meet a model of the future translation vector. Because the source content being translated is roughly the same as a semantic content of the target information, that is, $c_t \approx E(y_t)$, a new indicator expected value is defined to directly evaluate the consistency between the future translation vector change and the corresponding generated target information on a semantic level.

The first indicator expected value may be calculated by using the following manner:

$$\text{loss}(\Delta_t^F, E(y_t)) = \frac{\exp(\tanh(\Delta_t^F, E(y_t)))}{\sum_y (\tanh(\Delta_t^F, E(y_t)))}.$$

$E(y_t)$ represents the target information, $y_t$ is a vector representation of the target information, and loss $(\Delta_t^F, E(y_t))$ is an indicator expected value that evaluates whether the future translation vector is updated as expected (for example, an update volume is basically the same as the translated source content). As the indicator expected value is greater, the expectation is more corresponded. $\Delta_t^F$ s an absolute value of a difference between the first translation vector $s_t^F$ and the third translation vector $s_{t-1}^F$.

Similarly, for the second indicator expected value, $\Delta_t^P$ is obtained by calculating according to the second translation vector $s_{t-1}^P$ and the fourth translation vector $s_t^P$, and further the second indicator expected value loss$(\Delta_t^P, E(y_t))$ is obtained.

The training target may be calculated by using the following manner according to the first indicator expected value and the second indicator expected value:

$$J(\theta, \gamma) = \operatorname*{argmin}_{\theta, \gamma} \sum_{n=1}^{N} \sum_{t=1}^{|y|}$$

-continued $$\left\{ \underbrace{\log P(y_t|y<t,x;\theta,\gamma)}_{likelihood} + \underbrace{\text{logloss}(\Delta_t^F, E(y_t)|\gamma)}_{FUTURE\ loss} + \underbrace{\text{logloss}(\Delta_t^P, E(y_t)|\gamma)}_{PAST\ loss} \right\}.$$

$J(\theta, \gamma)$ represents a parameter obtained by training, and is a general representation of the training target. $\theta$ represents a parameter of the NMT system, $\gamma$ represents a newly introduced parameter of the past-future module, and $$\underset{\theta,\gamma}{\operatorname{argmax}}$$

represents a parameter corresponding to a training target that obtains a highest point (that is, the likelihood, the future loss, and the past loss in the formula).

$$\underbrace{\log P(y_t|y<t,x;\theta,\gamma)}_{likelihood}$$

represents a target of a standard neural network translation module, that is, a generation probability of maximizing each piece of target information, or may be expressed as a likelihood point generated to maximize the target word.

$$\underbrace{\text{logloss}(\Delta_t^F, E(y_t)|\gamma)}_{FUTURE\ loss}$$

represents the first indicator expected value of the future translation vector, and $$\underbrace{\text{logloss}(\Delta_t^P, E(y_t)|\gamma)}_{PAST\ loss}$$

represents the second indicator expected value of the past translation vector.

Again, in this embodiment of the present disclosure, the first indicator expected value is obtained according to the first translation vector and the third translation vector, the second indicator expected value is obtained according to the second translation vector and the fourth translation vector, and then the training target is determined according to the first indicator expected value and the second indicator expected value. The training target is used for building the preset neural network model. Through the foregoing manner, the training target can be added, and the training target of this part can meet the consistency of the semantic level, thereby improving accuracy and feasibility of training.

Figure 9:
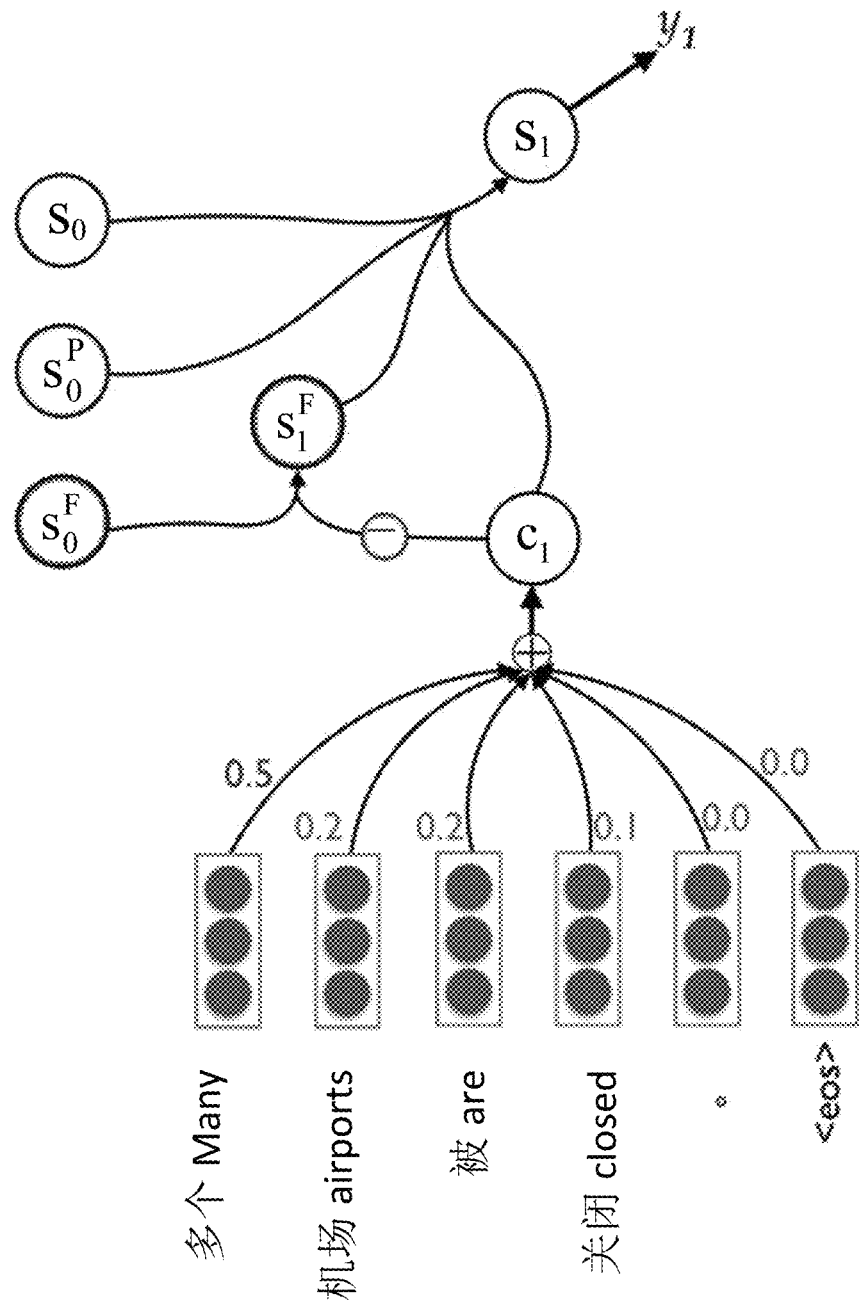
FIG. 9 is a schematic diagram of an embodiment of translating a first source content in a source vector representation sequence in an application scenario of the present disclosure.

For ease of understanding, a procedure of determining the target information in the present disclosure may be described below in detail by using a specific application scenario. Referring to FIG. 9, FIG. 9 is a schematic diagram of an embodiment of translating a first source content in a source vector representation sequence in an application scenario of the present disclosure. The procedure is specifically as follows:

An encoder reads in an input sentence "多个机场被迫关闭 <eos>". <eos> represents a sentence end symbol, and then a source vector representation sequence is output, where each vector (that is, dots and lines in FIG. 9) corresponds to a source content. The decoder generates a translated text according to the source vector representation sequence.

First, the alignment probability and the semantic vector are weighted, to generate the source context vector $c_1$ of the first instance, and the alignment probability is 0.5, 0.2, 0.2, 0.1, 0.0 and 0.0 in FIG. 9. Then the past translation vector and the future translation vector are updated according to $c_1$, that is, the following formulas are used:

$$s_1^P = s_0^P + c_1; \text{ and}$$

$$s_1^F = s_0^F - c_1.$$

$s_1^P$ represents a past translation vector of the first instance, $s_0^P$ represents a past translation vector of an initial moment, $s_1^F$ represents a future translation vector of the first instance, and $s_0^F$ represents a future translation vector of the initial moment.

The decoder decodes $c_1$, $s_1^F$, $s_0^P$ and a decoder state $s_0$ of the initial moment, which can update a decoder state $s_1$ of the first instance. A neural network output layer is used according to $s_0$ and $c_1$, and is compared with all target words, in which a word with a highest similarity is used as the target information $y_1$, where $y_1$ is the translation "many" of "多个".

Figure 10:
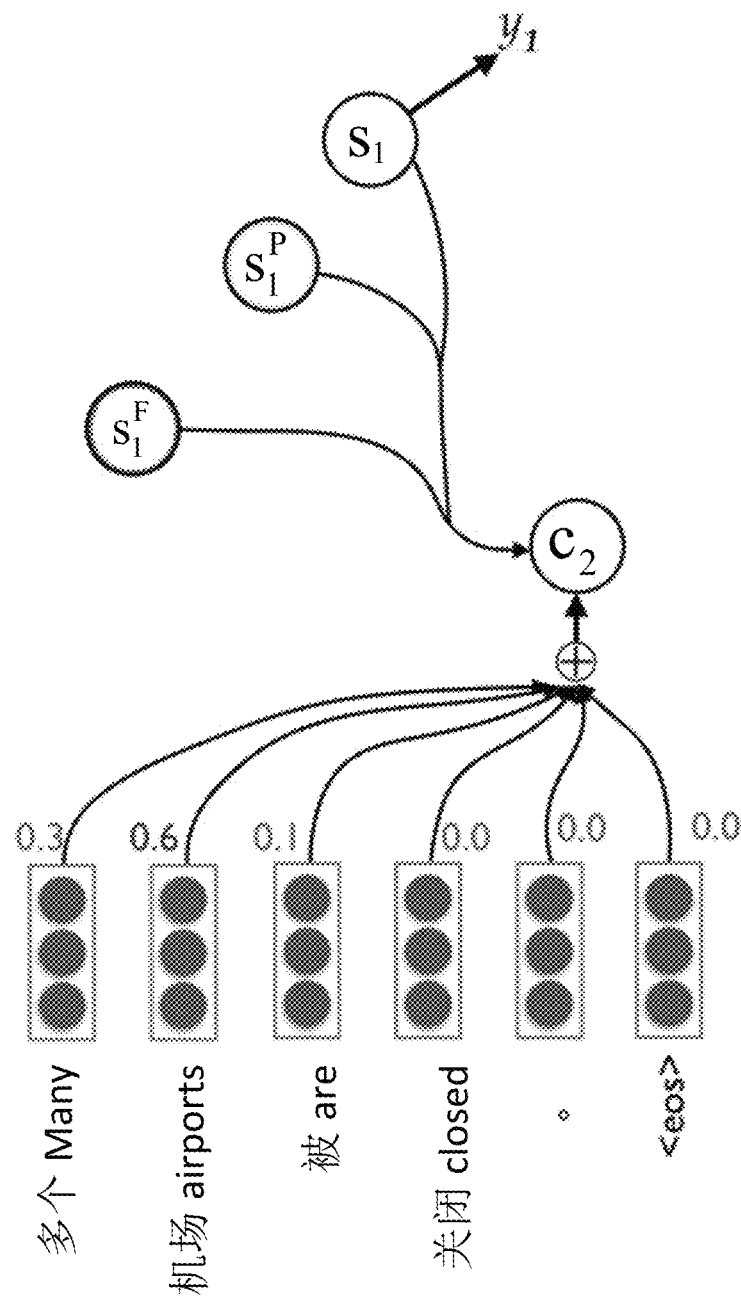
FIG. 10 is a schematic diagram of an embodiment of translating a second source content in the source vector representation sequence in the application scenario of the present disclosure.

Referring to FIG. 10, FIG. 10 is a schematic diagram of an embodiment of translating a second source content in the source vector representation sequence in an application scenario of the present disclosure. As shown in FIG. 10, first, the alignment probability and the semantic vector are weighted, to generate the source context vector $c_2$ of the second instance, and the alignment probability is 0.3, 0.6, 0.1, 0.0, 0.0 and 0.0 in FIG. 10. Then the past translation vector and the future translation vector are updated according to $c_2$, that is, the following formulas are used:

$$s_2^P = s_1^P + c_2; \text{ and}$$

$$s_2^F = s_1^F - c_2.$$

$s_2^P$ represents a past translation vector of the second instance, $s_1^P$ represents the past translation vector of the first instance, $s_2^F$ represents a future translation vector of the second instance, and $s_1^F$ represents the future translation vector of the first instance.

The decoder decodes $c_2$, $s_1^F$, $s_1^P$ and a decoder state $s_1$ of the first instance, which can update a decoder state of the second instance. A neural network output layer is used according to $s_1$, $c_2$ and the target information $y_1$ generated previously, and is compared with all target words, in which a word with a highest similarity is used as the target information $y_2$, where $y_2$ is the translation "airports" of "机场".

The entire input sentence is translated based on the foregoing.

Figure 11:
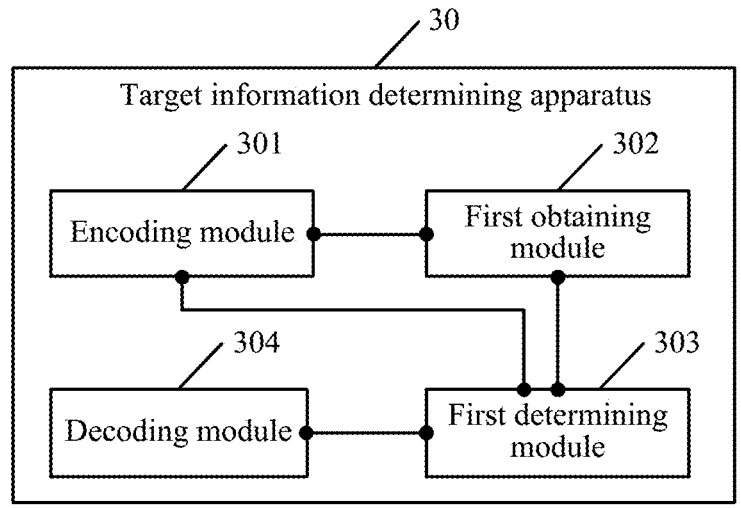
FIG. 11 is a schematic diagram of an embodiment of the target information determining apparatus according to the embodiments of the present disclosure.

The target information determining apparatus of the present disclosure is described in detail below. Referring to FIG. 11, a target information determining apparatus 30 in an embodiment of the present disclosure includes at least one memory and at least one processor. The at least one memory stores at least one instruction module, configured to be executed by the at least one processor. The at least one instruction module includes: an encoding module 301, configured to encode to-be-processed text information, to obtain a source vector representation sequence; a first obtaining module 302, configured to obtain, according to the source vector representation sequence obtained by the encoding module 301 through encoding, a source context vector corresponding to a first instance, the source context vector being used for representing to-be-processed source content; a first determining module 303, configured to determine a first translation vector and/or a second translation vector according to the source vector representation sequence obtained by the encoding module 301 through encoding and the source context vector obtained by the first obtaining module 302, the first translation vector indicating an untranslated source content in the source vector representation sequence at the first instance, the second translation vector indicating a translated source content in the source vector representation sequence at a second instance, and the second instance being an adjacent instance before the first instance; and a decoding module 304, configured to decode the first translation vector and/or the second translation vector determined by the first determining module 303 and the source context vector, to obtain target information of the first instance.

In this embodiment, the encoding module 301 encodes to-be-processed text information, to obtain a source vector representation sequence. The first obtaining module 302 obtains, according to the source vector representation sequence obtained by the encoding module 301 through encoding, a source context vector corresponding to a first instance, the source context vector being used for representing to-be-processed source content. The first determining module 303 determines a first translation vector and/or a second translation vector according to the source vector representation sequence obtained by the encoding module 301 through encoding and the source context vector obtained by the first obtaining module 302, the first translation vector indicating an untranslated source content in the source vector representation sequence at the first instance, the second translation vector indicating a translated source content in the source vector representation sequence at a second instance, and the second instance being an adjacent instance before the first instance. The decoding module 304 decodes the first translation vector and/or the second translation vector determined by the first determining module 303 and the source context vector, to obtain target information of the first instance.

In an embodiment of the present disclosure, a target information determining apparatus is provided. First, the target information determining apparatus encodes to-be-processed text information, to obtain a source vector representation sequence; then obtains, according to the source vector representation sequence, a source context vector corresponding to a first instance, the source context vector being used for representing to-be-processed source content; and determines a first translation vector and/or a second translation vector according to the source vector representation sequence and the source context vector, the first translation vector indicating an untranslated source content in the source vector representation sequence at the first instance, the second translation vector indicating a translated source content in the source vector representation sequence at a second instance, and the second instance is an adjacent instance before the first instance. Finally, the target information determining apparatus decodes the first translation vector and/or the second translation vector and the source context vector, to obtain target information of the first instance. Through the foregoing manner, the untranslated source content and/or the translated source content in the source vector representation sequence can be modeled, that is, the contents can be separated from an original language model for training, thereby reducing a difficulty of model training of a decoder, and improving a translation effect of a translation system.

Figure 12:
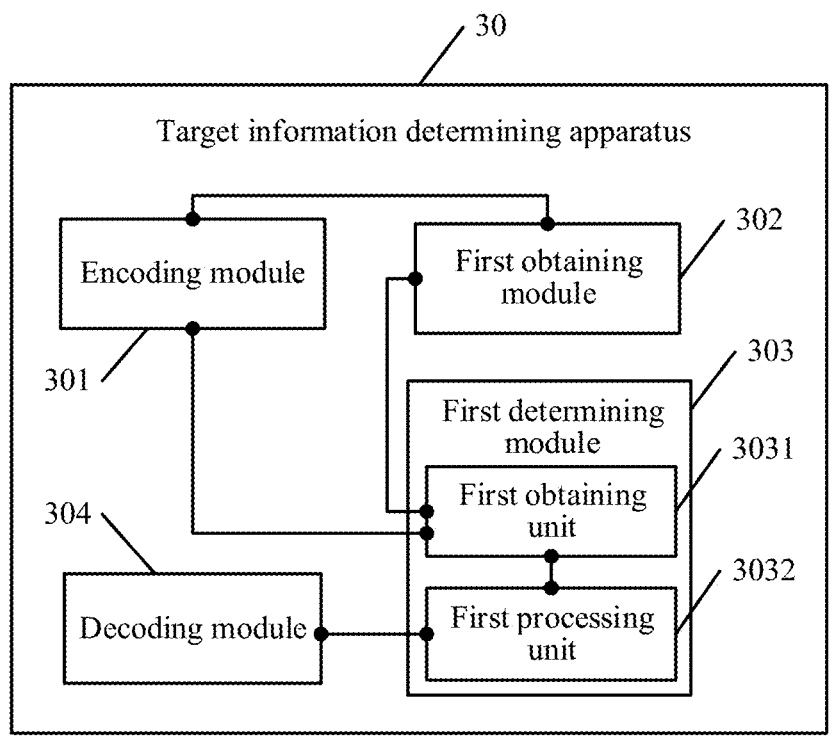
FIG. 12 is a schematic diagram of another embodiment of the target information determining apparatus according to the embodiments of the present disclosure.

In some embodiments, based on the embodiment corresponding to FIG. 11, referring to FIG. 12, in another embodiment of the target information determining apparatus 30 provided in the embodiments of the present disclosure, the first determining module 303 includes: a first obtaining unit 3031, configured to obtain, according to the source vector representation sequence, a third translation vector corresponding to the second instance; and a first processing unit 3032, configured to process the third translation vector obtained by the first obtaining unit 3031 and the source context vector by using a preset neural network model, to obtain the first translation vector.

Second, in this embodiment of the present disclosure, how to determine the first translation vector according to the source vector representation sequence and the source context vector is described. That is, the third translation vector corresponding to the second instance is obtained according to the source vector representation sequence; and then the third translation vector and the source context vector are processed by using the preset neural network model, to obtain the first translation vector. Through the foregoing manner, the first translation vector is outputted by using the preset neural network model, which can improve accuracy of a future translation vector.

Figure 13:
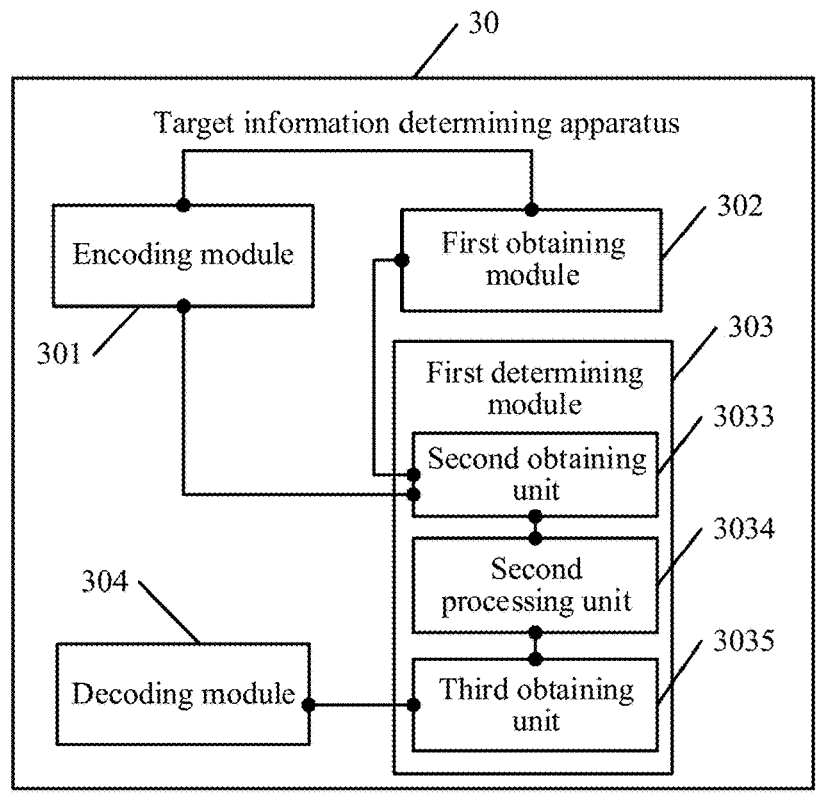
FIG. 13 is a schematic diagram of another embodiment of the target information determining apparatus according to the embodiments of the present disclosure.

In some embodiments, based on the embodiment corresponding to FIG. 11, referring to FIG. 13, in another embodiment of the target information determining apparatus 30 provided in the embodiments of the present disclosure, the first determining module 303 includes: a second obtaining unit 3033, configured to obtain, according to the source vector representation sequence, a third translation vector corresponding to the second instance; a second processing unit 3034, configured to process the third translation vector obtained by the second obtaining unit 3033 and the source context vector by using a preset neural network model, to obtain the first translation vector; and a third obtaining unit 3035, configured to obtain the second translation vector according to a location of the source context vector in the source vector representation sequence, the second translation vector being used for updating a fourth translation vector corresponding to the first instance, and the fourth translation vector being obtained by processing the second translation vector and the source context vector by using the preset neural network model.

Second, in this embodiment of the present disclosure, how to determine the first translation vector and the second translation vector according to the source vector representation sequence and the source context vector is described. That is, the third translation vector corresponding to the second instance is obtained according to the source vector representation sequence; and then the third translation vector and the source context vector are processed by using the preset neural network model, to obtain the first translation vector, and further, the second translation vector may be obtained according to the location of the source context vector in the source vector representation sequence, the second translation vector being used for updating the fourth translation vector corresponding to the first instance, and the fourth translation vector being obtained by processing the second translation vector and the source context vector by using the preset neural network model. Through the foregoing manner, accuracy of a past translation vector and a future translation vector can be improved.

Figure 14:
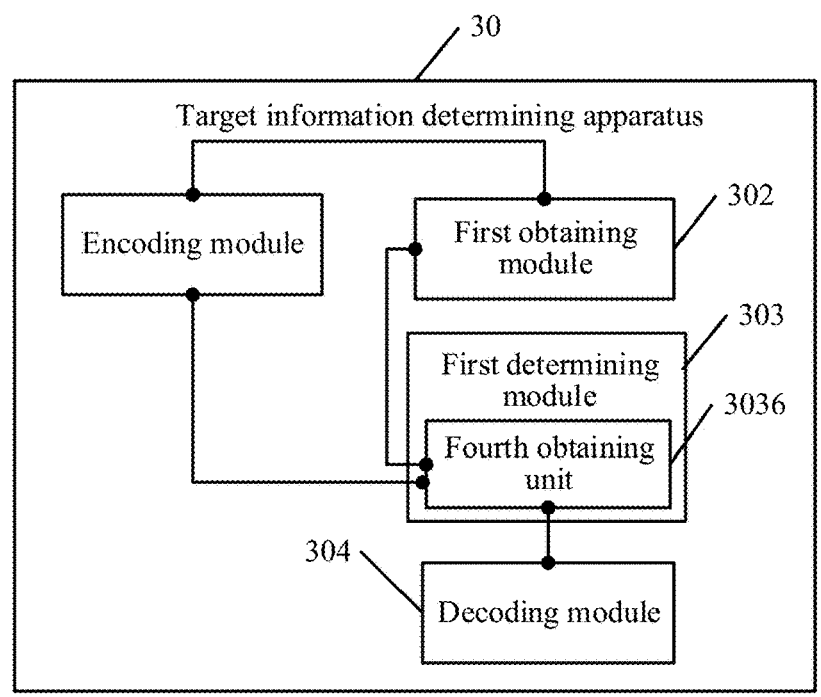
FIG. 14 is a schematic diagram of another embodiment of the target information determining apparatus according to the embodiments of the present disclosure.

In some embodiments, based on the embodiment corresponding to FIG. 11, referring to FIG. 14, in another embodiment of the target information determining apparatus 30 provided in the embodiments of the present disclosure, the first obtaining unit 303 includes: a fourth obtaining unit 3036, configured to obtain the second translation vector according to a location of the source context vector in the source vector representation sequence, the second translation vector being used for generating a fourth translation vector corresponding to the first instance, and the fourth translation vector being obtained by processing the second translation vector and the source context vector by using the preset neural network model.

Second, in this embodiment of the present disclosure, how to determine the second translation vector according to the source vector representation sequence and the source context vector is described. That is, the second translation vector is obtained according to the location of the source context vector in the source vector representation sequence, the second translation vector being used for generating the fourth translation vector corresponding to the first instance, and the fourth translation vector being obtained by processing the second translation vector and the source context vector by using the preset neural network model. Through the foregoing manner, the second translation vector is outputted by using the preset neural network model, which can improve accuracy of a past translation vector.

Figure 15:
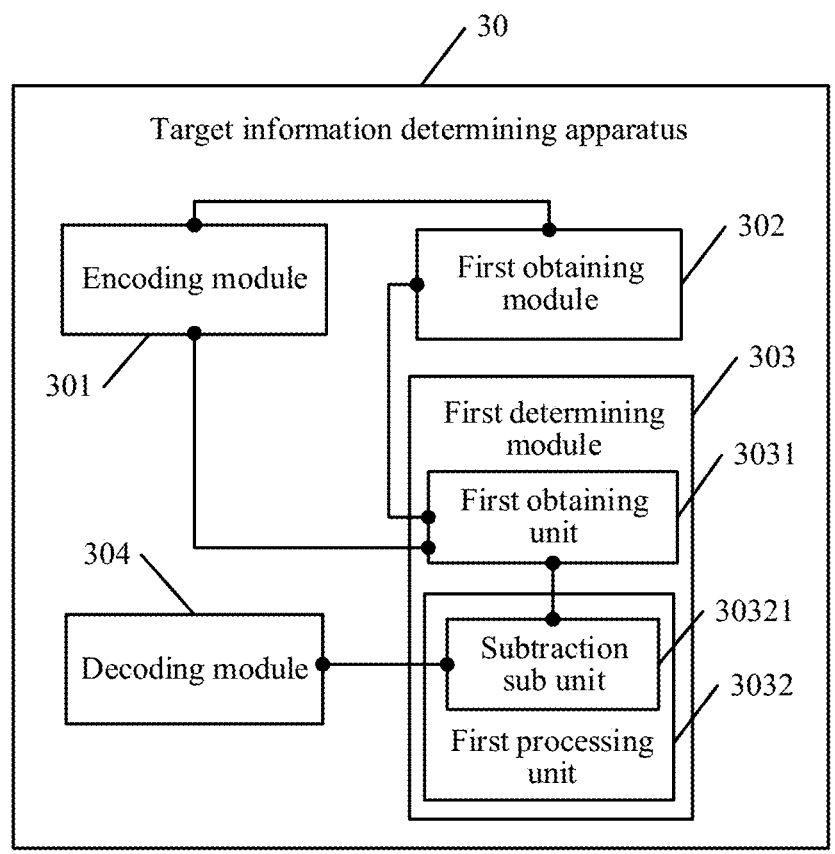
FIG. 15 is a schematic diagram of another embodiment of the target information determining apparatus according to the embodiments of the present disclosure.

In some embodiments, based on the embodiment corresponding to FIG. 12 or FIG. 13, referring to FIG. 15, in another embodiment of the target information determining apparatus 30 provided in the embodiments of the present disclosure, the first processing unit 3032 includes: a subtraction subunit 30321, configured to subtract the source context vector form the third translation vector by using a GRU, to obtain the first translation vector.

Again, in this embodiment of the present disclosure, the GRU can be used to subtract the source context vector from the third translation vector, to obtain the first translation vector, and further transmit the obtained first translation vector into the GRU structure. Through the foregoing manner, the signal of decreasing can be provided in the GRU, which helps to learn the rule, thereby improving accuracy of model training.

Figure 16:
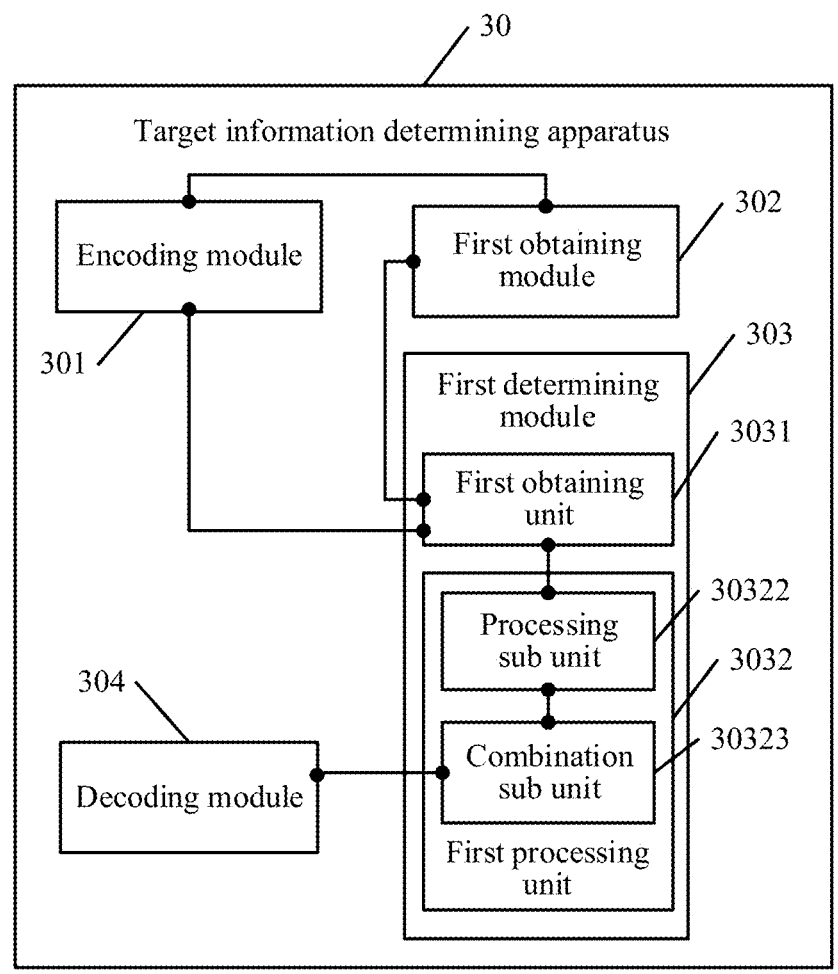
FIG. 16 is a schematic diagram of another embodiment of the target information determining apparatus according to the embodiments of the present disclosure.

In some embodiments, based on the embodiment corresponding to FIG. 12 or FIG. 13, referring to FIG. 16, in another embodiment of the target information determining apparatus 30 provided in the embodiments of the present disclosure, the first processing unit 3032 includes: a processing subunit 30322, configured to process the third translation vector and the source context vector by using a GRU, to obtain a middle vector; and a combination subunit 30323, configured to perform an interpolation combination on the middle vector obtained by the processing subunit 30322 through processing and the third translation vector, to obtain the first translation vector.

Further, in this embodiment of the present disclosure, a procedure that the target information determining apparatus processes the third translation vector and the source context vector by using a preset neural network model, to obtain the first translation vector may be: first processing the third translation vector and the source context vector by using a GRU, to obtain a middle vector, and performing an interpolation combination on the middle vector and the third translation vector, to obtain the first translation vector. Through the foregoing manner, performing the operation of decreasing inside the GRU helps to improve operating accuracy and operating efficiency.

Figure 17:
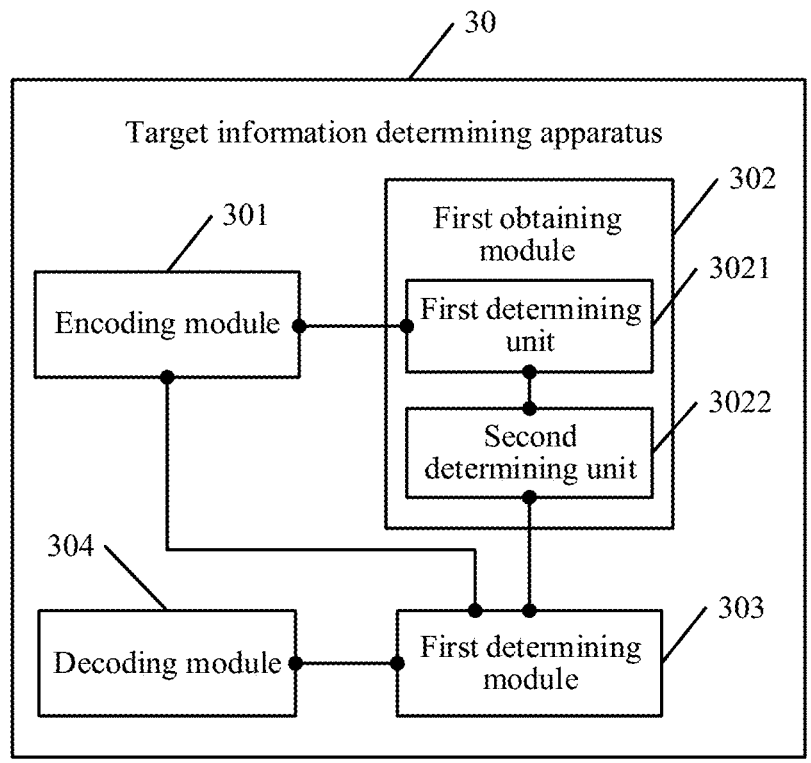
FIG. 17 is a schematic diagram of another embodiment of the target information determining apparatus according to the embodiments of the present disclosure.

In some embodiments, based on the embodiment corresponding to FIG. 11, referring to FIG. 17, in another embodiment of the target information determining apparatus 30 provided in the embodiments of the present disclosure, the first obtaining module 302 includes: a first determining unit 3021, configured to determine an alignment probability of the source content according to a decoder state of the second instance, the second translation vector, a third translation vector, and a vector of a source content in the source vector representation sequence; and a second determining unit 3022, configured to determine, according to the alignment probability of the source content determined by the first determining unit 3021 and a semantic vector of the source content, the source context vector corresponding to the first instance.

Second, in this embodiment, first the alignment probability of the source content may be determined according to the decoder state of the second instance, the second translation vector, the third translation vector, and the vector of the source content in the source vector representation sequence, and then the source context vector of the first instance is determined according to the alignment probability of the source content and the semantic vector of the source content. Through the foregoing manner, the attention module in the target information determining apparatus can learn which source contents have been translated, and which source contents have not been translated, so that more attention is paid on the untranslated contents while less attention is paid on the translated contents, thereby alleviating the problem of missing translation and repeated translation.

Figure 18:
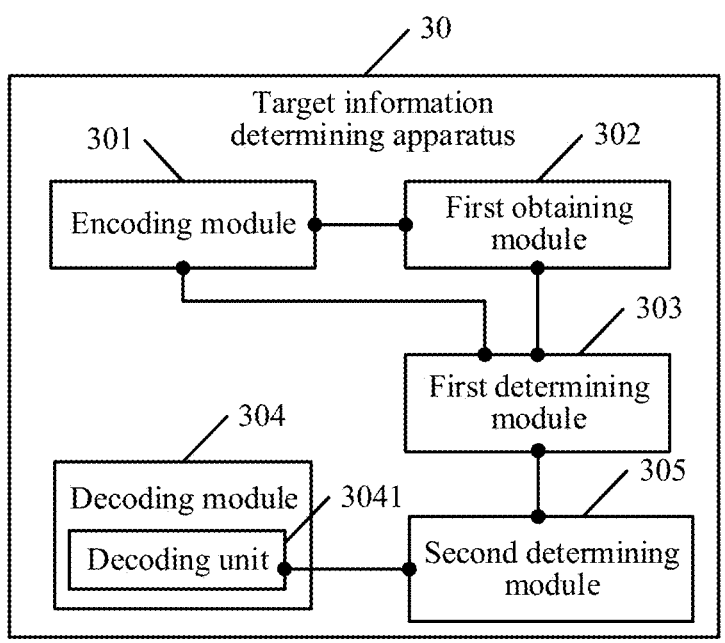
FIG. 18 is a schematic diagram of another embodiment of the target information determining apparatus according to the embodiments of the present disclosure.

In some embodiments, based on the embodiment corresponding to FIG. 11, referring to FIG. 18, in another embodiment of the target information determining apparatus 30 provided in the embodiments of the present disclosure, the target information determining apparatus 30 may further include: a second determining module 305, configured to: before the decoding module 304 decodes the first translation vector and/or the second translation vector and the source context vector, to obtain target information of the first instance, determine a decoder state of the first instance according to a decoder state of the second instance, target information of the second instance, the source context vector, the first translation vector, and the second translation vector; and the decoding module 304 includes: a decoding unit 3041, configured to decode the decoder state of the first instance, the source context vector, the first translation vector and/or the second translation vector, to obtain the target information of the first instance.

Further, in this embodiment of the present disclosure, first the decoder state of the first instance needs to be determined according to the decoder state of the second instance, the target information of the second instance, the source context vector, the first translation vector and the second translation vector, and then the decoder state of the first instance, the source context vector, the first translation vector and/or the second translation vector are decoded, to obtain the target information of the first instance. Through the foregoing manner, models of the first translation vector and/or the second translation vector are separated from the decoder state, and may form a complete source semantic vector representation with the source context vector outputted by the attention module at the first instance, to be transmitted to the decoder to generate more accurate target information.

Figure 19:
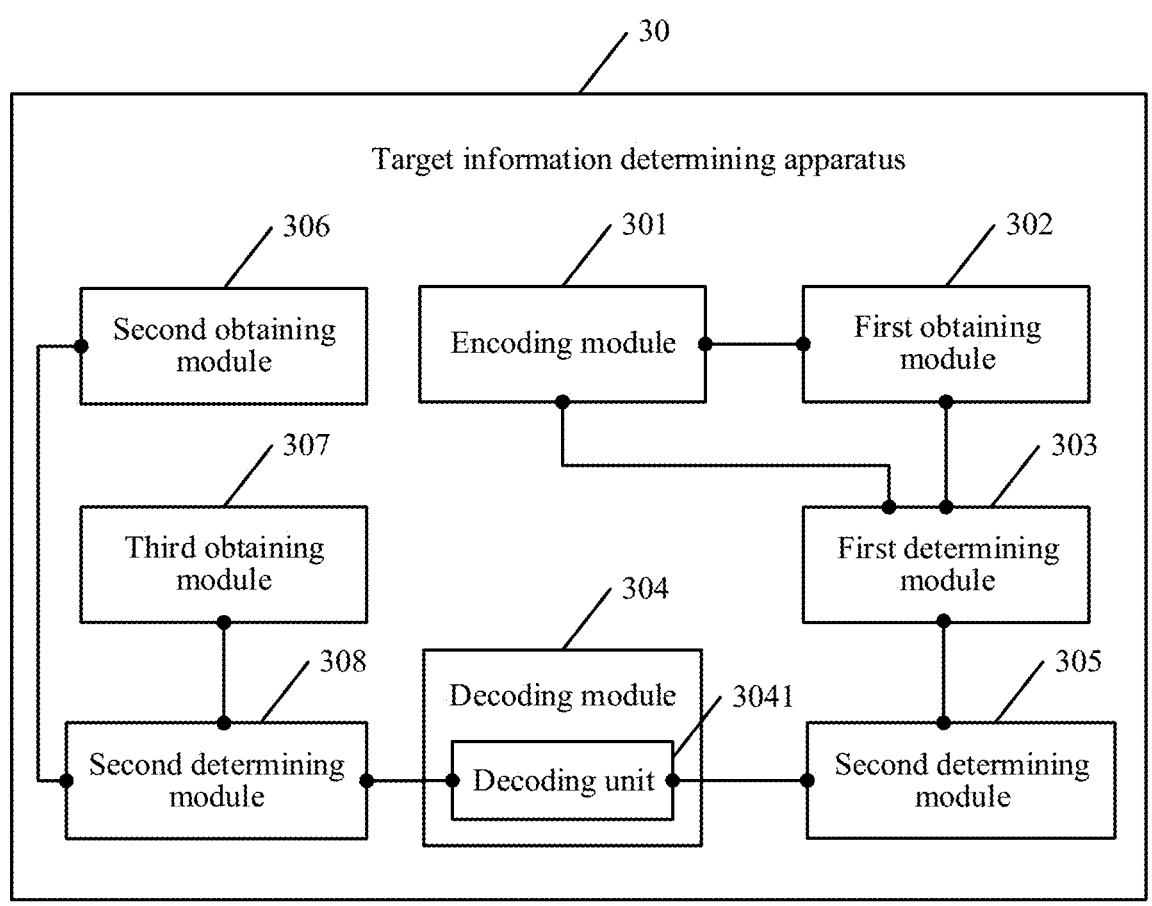
FIG. 19 is a schematic diagram of another embodiment of the target information determining apparatus according to the embodiments of the present disclosure.

In some embodiments, based on the embodiment corresponding to FIG. 17 or FIG. 18, referring to FIG. 19, in another embodiment of the target information determining apparatus 30 provided in the embodiments of the present disclosure, the target information determining apparatus 30 may further include: a second obtaining module 306, configured to obtain a first indicator expected value according to the first translation vector and the third translation vector, the first indicator expected value being used for representing a consistency situation of semantics between a future translation vector change and the target information of the first instance; a third obtaining module 307, configured to obtain a second indicator expected value according to the second translation vector and the fourth translation vector, the second indicator expected value being used for representing a consistency situation of semantics between a past translation vector change and the target information of the first instance; and a second determining module 308, configured to determine a training target according to the first indicator expected value obtained by the second obtaining module 306 and the second indicator expected value obtained by the third obtaining module 307, the training target being used for building a preset neural network model.

Again, in this embodiment of the present disclosure, the first indicator expected value is obtained according to the first translation vector and the third translation vector, and the second indicator expected value is obtained according to the second translation vector and the fourth translation vector, and then the training target is determined according to the first indicator expected value and the second indicator expected value, the training target being used for building the preset neural network model. Through the foregoing manner, the training target can be added, and the training target of this part can meet the consistency of the semantic level, thereby improving accuracy and feasibility of training.

Figure 20:
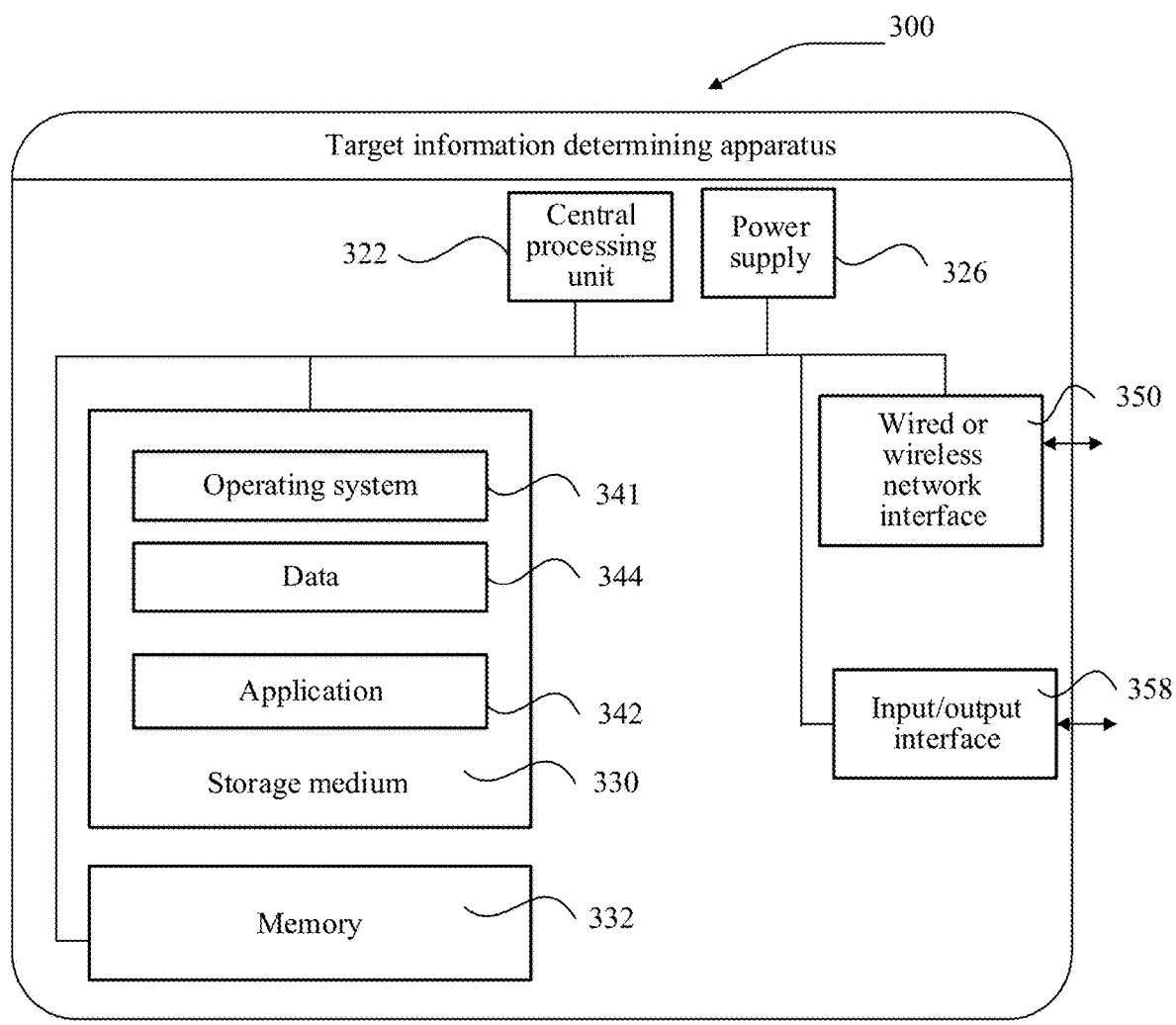
FIG. 20 is a schematic structural diagram of the target information determining apparatus according to an embodiment of the present disclosure.

FIG. 20 is a schematic structural diagram of a target information determining apparatus according to an embodiment of the present disclosure. The target information determining apparatus 300 may vary greatly due to different configurations or performance, and may include one or more central processing units (CPUs) 322 (for example, one or more processors), a memory 332, and one or more storage media 330 (for example, one or more mass storage devices) that store applications 342 or data 344. The memory 332 and the storage medium 330 may be transient or persistent storages. The program stored in the storage medium 330 may include one or more modules (not shown in the figure), and each module may include a series of instructions and operations for the target information determining apparatus. Further, the CPU 322 may be configured to communicate with the storage medium 330, and perform, on the target information determining apparatus 300, the series of instructions and operations in the storage medium 330.

The target information determining apparatus 300 may further include one or more power supplies 326, one or more wired or wireless network interfaces 350, one or more input/output interfaces 358, and/or one or more operating systems 341, for example, Windows Server™, Mac OS X™, Unix™, Linux™, or FreeBSD™.

Steps performed by the target information determining apparatus in the foregoing embodiments may be based on the structure of the target information determining apparatus shown in FIG. 20.

The CPU 322 is configured to perform the following steps: encoding to-be-processed text information, to obtain a source vector representation sequence; obtaining, according to the source vector representation sequence, a source context vector corresponding to a first instance, the source context vector being used for representing to-be-processed source content; determining a first translation vector and/or a second translation vector according to the source vector representation sequence and the source context vector, the first translation vector indicating an untranslated source content in the source vector representation sequence at the first instance, the second translation vector indicating a translated source content in the source vector representation sequence at a second instance, and the second instance is an adjacent instance before the first instance; and decoding the first translation vector and/or the second translation vector and the source context vector, to obtain target information of the first instance.

In some embodiments, the CPU 322 is specifically configured to perform the following steps: obtaining, according to the source vector representation sequence, a third translation vector corresponding to the second instance; and processing the third translation vector and the source context vector by using a preset neural network model, to obtain the first translation vector.

In some embodiments, the CPU 322 is specifically configured to perform the following steps: obtaining, according to the source vector representation sequence, a third translation vector corresponding to the second instance; processing the third translation vector and the source context vector by using a preset neural network model, to obtain the first translation vector; and obtaining the second translation vector according to a location of the source context vector in the source vector representation sequence, the second translation vector being used for updating a fourth translation vector corresponding to the first instance, and the fourth translation vector being obtained by processing the second translation vector and the source context vector by using the preset neural network model.

In some embodiments, the CPU 322 is specifically configured to perform the following step: obtaining the second translation vector according to a location of the source context vector in the source vector representation sequence, the second translation vector being used for generating a fourth translation vector corresponding to the first instance, and the fourth translation vector being obtained by processing the second translation vector and the source context vector by using the preset neural network model.

In some embodiments, the CPU 322 is specifically configured to perform the following step: subtracting the source context vector from the third translation vector by using a GRU, to obtain the first translation vector.

In some embodiments, the CPU 322 is specifically configured to perform the following steps: processing the third translation vector and the source context vector by using a GRU, to obtain a middle vector; and performing an interpolation combination on the middle vector and the third translation vector, to obtain the first translation vector.

In some embodiments, the CPU 322 is specifically configured to perform the following steps: determining an alignment probability of a source content according to a decoder state of the second instance, the second translation vector, the third translation vector, and a vector of the source content in the source vector representation sequence; and determining the source context vector corresponding to the first instance according to the alignment probability of the source content and a semantic vector of the source content.

In some embodiments, the CPU 322 is further configured to perform the following step: determining a decoder state of the first instance according to a decoder state of the second instance, target information of the second instance, the source context vector, the first translation vector, and the second translation vector.

The CPU 322 is specifically configured to perform the following step: decoding the decoder state of the first instance, the first translation vector, the second translation vector, and the source context vector, to obtain the target information of the first instance.

In some embodiments, the CPU 322 is specifically configured to perform the following steps: obtaining a first indicator expected value according to the first translation vector and the third translation vector, where the first indicator expected value is used for representing a consistency situation of semantics between a future translation vector change and the target information of the first instance; obtaining a second indicator expected value according to the second translation vector and the fourth translation vector, where the second indicator expected value is used for representing a consistency situation of semantics between a past translation vector change and the target information of the first instance; and determining a training target according to the first indicator expected value and the second indicator expected value, where the training target is used for building a preset neural network model.

It is understood by persons skilled in the art that for convenience and brevity of description, for a detailed working process of the foregoing system, apparatus, and unit, reference may be made to a corresponding process in the foregoing manner embodiments, and details are not repeated herein again.

In some embodiments provided in this application, it is to be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the related art, or all or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash memory drive, a removable hard disk, a read-only memory (ROM), a random access memory (RAM), a magnetic disk, or an optical disc. Therefore, an embodiment of the present disclosure further provides a computer-readable storage medium including an instruction. When run on a computer, the instruction causes the computer to perform the foregoing method.

The foregoing embodiments are merely intended to describe the technical solutions of the present disclosure, but not to limit the present disclosure. Although the present disclosure is described in detail with reference to the foregoing embodiments, it is to be understood by persons of ordinary skill in the art that they may still make modifications to the technical solutions described in the foregoing embodiments or make equivalent replacements to some technical features thereof, without departing from the spirit and scope of the technical solutions of the embodiments of the present disclosure.

What is claimed is:

1. A target information determining method, comprising:
   obtaining a source vector representation sequence based on to-be-processed text information;
   obtaining a source context vector corresponding to a first instance according to the source vector representation sequence, the source context vector corresponding to the first instance indicating to-be-processed source content in the to-be-processed text information at the first instance;
   obtaining a past translation vector corresponding to a second instance that represents a translated source content in the source vector representation sequence at the second instance, a future translation vector corresponding to the second instance that represents an untranslated source content in the source vector representation sequence at the second instance, wherein the second instance is an adjacent instance before the first instance;
   determining a past translation vector corresponding to the first instance and a future translation vector corresponding to the first instance according to the source context vector corresponding to the first instance, the past translation vector corresponding to the second instance, and the future translation vector corresponding to the second instance; and
   obtaining target information of the first instance based on the past translation vector corresponding to the second instance, the future translation vector corresponding to the first instance, and the source context vector corresponding to the first instance.

2. The method according to claim 1, wherein: the to-be-processed text information belongs to a first language; and the target information belongs to a second language.

3. The method according to claim 2, wherein obtaining the source vector representation sequence comprises:
   inputting the to-be-processed text information to an encoder; and
   obtaining the source vector representation sequence according to an encoding result, wherein source vectors in the source vector representation sequence belong to the first language.

4. The method according to claim 1, wherein obtaining the target information of the first instance comprises:
   inputting the past translation vector corresponding to the second instance, the future translation vector corresponding to the first instance and the source context vector corresponding to the first instance to a decoder; and obtaining translation content of the to-be-processed source content according to a decoding result, wherein the translation content is the target information of the first instance.

5. The method according to claim 4, wherein the decoder includes two hidden layers respectively directed to the past translation vector corresponding to the second instance and the future translation vector corresponding to the first instance.

6. The method according to claim 4, further comprising:
determining a decoder state of the first instance according to the decoder state of the second instance, target information of the second instance, the source context vector, the past translation vector corresponding to the second instance, and the future translation vector corresponding to the first instance; and
decoding the decoder state of the first instance, the source context vector, the past translation vector corresponding to the second instance, and the future translation vector corresponding to the first instance, to obtain the target information of the first instance.

7. The method according to claim 1, further comprising:
obtaining the future translation vector corresponding to the second instance according to the source vector representation sequence; and
processing the future translation vector corresponding to the second instance and the source context vector by using a neural network model, to obtain the future translation vector corresponding to the first instance.

8. The method according to claim 7, wherein the processing the future translation vector corresponding to the second instance and the source context vector by using a neural network model, to obtain future translation vector corresponding to the first instance comprises:
subtracting the source context vector from the future translation vector corresponding to the second instance by using a gated recurrent unit (GRU), to obtain the future translation vector corresponding to the first instance.

9. The method according to claim 7, wherein the processing the future translation vector corresponding to the second instance third translation vector and the source context vector by using a preset neural network model, to obtain future translation vector corresponding to the first instance the first translation vector comprises:
processing the future translation vector corresponding to the second instance and the source context vector by using a GRU, to obtain a middle vector; and
performing an interpolation combination on the middle vector and the future translation vector corresponding to the second instance, to obtain the future translation vector corresponding to the first instance.

10. The method according to claim 1, further comprising:
obtaining the future translation vector corresponding to the second instance according to the source vector representation sequence;
processing the future translation vector corresponding to the second instance and the source context vector by using a neural network model, to obtain the future translation vector corresponding to the first instance; and
obtaining the past translation vector corresponding to the second instance according to a location of the source context vector in the source vector representation sequence, wherein the past translation vector corresponding to the first instance is obtained by processing the past translation vector corresponding to the second instance and the source context vector by using the neural network model.

11. The method according to claim 1, further comprising:
obtaining the past translation vector corresponding to the second instance according to a location of the source context vector in the source vector representation sequence, wherein the past translation vector corresponding to the first instance is obtained by processing the past translation vector corresponding to the second instance and the source context vector by using a neural network model.

12. The method according to claim 1, wherein the obtaining a source context vector corresponding to a first instance according to the source vector representation sequence comprises:
determining an alignment probability of the source content according to a decoder state of the second instance, the past translation vector corresponding to the second instance, a future translation vector corresponding to the second instance and a vector of the source content in the source vector representation sequence; and
determining the source context vector corresponding to the first instance according to the alignment probability of the source content and a semantic vector of the source content.

13. The method according to claim 12, further comprising:
obtaining a first indicator expected value according to the future translation vector corresponding to the first instance, wherein the first indicator expected value represents a consistency situation of semantics between a future translation vector change and the target information of the first instance;
obtaining a second indicator expected value according to past translation vector corresponding to the second instance and a past translation vector corresponding to the first instance, wherein the second indicator expected value represents a consistency situation of semantics between a past translation vector change and the target information of the first instance; and
determining a training target according to the first indicator expected value and the second indicator expected value, wherein the training target is used for building a preset neural network model.

14. A target information determining apparatus, comprising at least one memory and at least one processor coupled to the memory, the at least one processor being configured to:
obtain a source vector representation sequence based on to-be-processed text information;
obtain a source context vector corresponding to a first instance according to the source vector representation sequence, the source context vector corresponding to the first instance indicating to-be-processed source content in the to-be-processed text information at the first instance;
obtain a past translation vector corresponding to a second instance that represents a translated source content in the source vector representation sequence at the second instance, a future translation vector corresponding to the second instance that represents an untranslated source content in the source vector representation sequence at the second instance, wherein the second instance is an adjacent instance before the first instance;
determine a past translation vector corresponding to the first instance and a future translation vector corresponding to the first instance according to the source context vector corresponding to the first instance, the past translation vector corresponding to the second instance, and the future translation vector corresponding to the second instance; and obtain target information of the first instance based on the past translation vector corresponding to the second instance, the future translation vector corresponding to the first instance, and the source context vector corresponding to the first instance.

15. A non-transitory computer readable storage medium, comprising an instruction, the instruction, when run on a computer, causing the computer to perform:

obtaining a source vector representation sequence based on to-be-processed text information;

obtaining a source context vector corresponding to a first instance according to the source vector representation sequence, the source context vector corresponding to the first instance indicating to-be-processed source content in the to-be-processed text information at the first instance;

obtaining a past translation vector corresponding to a second instance that represents a translated source content in the source vector representation sequence at the second instance, a future translation vector corresponding to the second instance that represents an untranslated source content in the source vector representation sequence at the second instance, wherein the second instance is an adjacent instance before the first instance;

determining a past translation vector corresponding to the first instance and a future translation vector corresponding to the first instance according to the source context vector corresponding to the first instance, the past translation vector corresponding to the second instance, and the future translation vector corresponding to the second instance; and obtaining target information of the first instance based on the past translation vector corresponding to the second instance, the future translation vector corresponding to the first instance, and the source context vector corresponding to the first instance.

16. The computer readable storage medium according to claim 15, wherein: the to-be-processed text information belongs to a first language; and the target information belongs to a second language.

17. The computer readable storage medium according to claim 16, wherein obtaining the source vector representation sequence comprises:

inputting the to-be-processed text information to an encoder; and obtaining the source vector representation sequence according to an encoding result, wherein source vectors in the source vector representation sequence belong to the first language.

18. The computer readable storage medium according to claim 15, wherein obtaining the target information of the first instance comprises:

inputting the past translation vector corresponding to the second instance, the future translation vector corresponding to the first instance and the source context vector corresponding to the first instance to a decoder; and obtaining translation content of the to-be-processed source content according to a decoding result, wherein the translation content is the target information of the first instance.

19. The computer readable storage medium according to claim 18, wherein the decoder includes two hidden layers respectively directed to the past translation vector corresponding to the second instance and the future translation vector corresponding to the first instance.

20. The computer readable storage medium according to claim 15, the obtaining a source context vector corresponding to a first instance according to the source vector representation sequence comprises:

determining an alignment probability of the source content according to a decoder state of the second instance, the past translation vector corresponding to the second instance, a future translation vector corresponding to the second instance and a vector of the source content in the source vector representation sequence; and determining the source context vector corresponding to the first instance according to the alignment probability of the source content and a semantic vector of the source content.

* * * * *